(12) United States Patent
Romaniuk et al.

(10) Patent No.: US 11,725,148 B2
(45) Date of Patent: Aug. 15, 2023

(54) CALCINED CLAY TAILINGS AND/OR CALCINED MINE WASTE, AND ASSOCIATED SYSTEMS AND METHODS

(71) Applicant: Graymont Western Canada Inc., Richmond (CA)

(72) Inventors: Nikolas Andrei Romaniuk, Edmonton (CA); Michael John Tate, Oregon, OH (US); Jared Ira Leikam, West Jordan, UT (US); Jesse Wayne Fox, West Valley City, UT (US); Narain Hariharan, South Jordan, UT (US)

(73) Assignee: Graymont Western Canada Inc., Richmond (CA)

(*) Notice: Subject to any disclaimer, the term of this patent is extended or adjusted under 35 U.S.C. 154(b) by 0 days.

(21) Appl. No.: 17/560,884

(22) Filed: Dec. 23, 2021

(65) Prior Publication Data

US 2022/0195306 A1    Jun. 23, 2022

Related U.S. Application Data

(60) Provisional application No. 63/130,294, filed on Dec. 23, 2020.

(51) Int. Cl.
*C10G 1/04* (2006.01)
*C04B 18/04* (2006.01)
(Continued)

(52) U.S. Cl.
CPC .......... *C10G 1/045* (2013.01); *C02F 11/145* (2019.01); *C04B 18/049* (2013.01); *C04B 18/12* (2013.01);
(Continued)

(58) Field of Classification Search
CPC ....... C02F 11/10; C02F 11/121; C02F 11/145; C02F 11/148; C02F 2103/10;
(Continued)

(56) References Cited

U.S. PATENT DOCUMENTS 4,227,996 A * 10/1980 Levine .................. B03D 1/006
  209/17
7,520,371 B2    4/2009 Lockledge et al.
(Continued)

FOREIGN PATENT DOCUMENTS

WO    2006127652 A2    11/2006

OTHER PUBLICATIONS

International Application No. PCT/US2021/065117—International Search Report and Written Opinion dated Apr. 15, 2022, 11 pages.

*Primary Examiner* — Ellen M McAvoy
*Assistant Examiner* — Chantel L Graham
(74) *Attorney, Agent, or Firm* — Perkins Coie LLP

(57) ABSTRACT

Methods and systems for calcining dewatered tailings and/or mine waste are disclosed herein. In some embodiments, the method comprises (i) processing dewatered tailings comprising clay minerals, (ii) calcining the processed tailings to produced calcined tailings, and (iii) altering a composition and/or one or more characteristics of the calcined tailings to produce a cementitious product. Altering the composition can include blending the calcined tailings with one or more additives, such as lime, dolomitic lime, lime kiln dust, argillaceous limestone, limestone, pulverized quicklime, ground calcium carbonate, quicklime, gypsum, natural pozzolans, artificial pozzolans, water, flow aids, or the like.

20 Claims, 4 Drawing Sheets

(51) Int. Cl.
*C02F 11/145* (2019.01)
*C04B 18/12* (2006.01)
*C02F 103/10* (2006.01)

(52) U.S. Cl.
CPC ...... *C02F 2103/10* (2013.01); *C02F 2209/06* (2013.01); *C10G 2300/1003* (2013.01); *C10G 2300/80* (2013.01)

(58) Field of Classification Search
CPC .............. C02F 2209/06; C02F 2301/08; C02F 2303/26; C02F 9/00; C04B 18/049; C04B 18/12; C10G 1/045; C10G 2300/1003; C10G 2300/80; Y02P 40/10; Y02P 40/18; Y02W 30/91
See application file for complete search history.

(56) References Cited

U.S. PATENT DOCUMENTS

| | | | |
|---|---|---|---|
| 2005/0109603 A1* | 5/2005 | Graham | C10J 3/723 201/25 |
| 2011/0061610 A1 | 3/2011 | Speirs et al. | |
| 2014/0311951 A1* | 10/2014 | Esmaeili | F23J 15/06 110/259 |
| 2019/0135690 A1* | 5/2019 | Sanchez | C04B 7/367 |
| 2020/0079664 A1 | 3/2020 | Leikam et al. | |

\* cited by examiner

CALCINED CLAY TAILINGS AND/OR CALCINED MINE WASTE, AND ASSOCIATED SYSTEMS AND METHODS

CROSS-REFERENCE TO RELATED APPLICATION(S)

The present application claims the benefit of and priority to U.S. Provisional Patent Application No. 63/130,294, filed Dec. 23, 2020, the disclosure of which is incorporated herein by reference in its entirety. The present application also incorporates herein by reference each of the following applications in their entireties: U.S. patent application Ser. No. 15/681,282 (now U.S. Pat. No. 10,647,606), filed on Aug. 18, 2017; U.S. patent application Ser. No. 16/184,689 (now U.S. Pat. No. 11,027,995), filed on Nov. 8, 2018; and U.S. patent application Ser. No. 16/566,578 (now U.S. Pat. No. 10,894,730), filed Sep. 10, 2019.

TECHNICAL FIELD

This present disclosure relates to calcined clay tailings and/or calcined mine waste, and associated systems and methods. Particular embodiments of the present disclosure relate to calcining tailings that have been treated with lime at elevated pH levels and/or mine waste, and blending one or more additives with the calcined tailings and/or calcined mine waste.

BACKGROUND

The extraction of bitumen from oil sands has been traditionally performed using the Clark Hot Water Extraction (CHWE) process or variants thereof. A tailings slurry, defined as whole tailings, is produced as a byproduct of the CHWE process, and can include water, sand, clay, and residual bitumen particles that are suspended in the extraction water. Coarse sand particles (e.g., >44 µm) can be easily removed from whole-tailings, but removal of finer particles (fines) can be more problematic. A portion of the remaining fines, water, and residual bitumen form a slurry that is about 10-15% solids by mass, which after a number of years can settle to be about 20-40% solids by mass. This slurry is referred to as fluid fine tailings (FFT) and/or mature fine tailings (MFT), and can remain for decades in a fluid state without further aggregation or settling. Slow consolidation, limited solids strength, and poor water quality of the FFT/MFT limits options for reclamation and has resulted in the formation of large tailings ponds.

A number of different technologies have been tried to improve the reclamation of FFT/MFT. Some of these technologies include whole-tailings treatment, non-segregating treatment (NST) production, composite or consolidated tailings (CT) production, tailings reduction operations (TRO), atmospheric drying, or treatment with polymers. Furthermore, some of these technologies include treating the FFT/MFT using coagulants such as gypsum and alum. These methods, however, have worked with only limited success and many technologies yield treated tailings that require additional treatments before reclamation is possible. For example, when using gypsum to treat FFT and/or MFT, the resulting release water contains high concentrations of soluble calcium, which can impair effectiveness of the subsequent extraction process. There currently exists over a billion cubic meters of FFT/MFT in tailings ponds. As such, there is a need for an improved method and process to treat oil sands tailings.

SUMMARY

Embodiments of the present technology relate to calcining a dewatered tailings and/or mining waste stream to produce a product that can be utilized within industry (e.g., the cement industry). The present technology is illustrated, for example, according to various aspects described below, including with reference to FIGS. 1-4. Various examples of aspects of the subject technology are described as numbered clauses (1, 2, 3, etc.) for convenience. These are provided as examples and do not limit the subject technology.

1. A method for providing a cementitious product, the method comprising:
   processing dewatered tailings comprising clay and/or pozzolanic minerals;
   calcining the processed tailings to produce calcined tailings; and
   altering a composition and/or one or more characteristics of the calcined tailings to produce a product.
2. The method of any one of the clauses herein, wherein the dewatered tailings have been treated with lime and have a pH of at least 11.5, 11.8 or 12.0.
3. The method of any one of the clauses herein, wherein the dewatered tailings comprise a filter press tailings cake.
4. The method of any one of the clauses herein, wherein processing the dewatered tailings comprises drying the dewatered tailings to produce dried tailings having a moisture content of no more than 9% by weight, 8% by weight, 7% by weight, 6% by weight, 5% by weight, 4% by weight, 3% by weight, 2% by weight, 1% by weight, or within a range of 6%-1% by weight, and wherein calcining the dewatered tailings comprises calcining the dried tailings.
5. The method of any one of the clauses herein, wherein processing the dewatered tailings comprises drying directly or indirectly the dewatered tailings via waste heat from the calcining to produce dried tailings having a moisture content of no more than 9% by weight, 8% by weight, 7% by weight, 6% by weight, 5% by weight, 4% by weight, 3% by weight, 2% by weight, 1% by weight, or within a range of 6%-1% by weight, and wherein calcining the dewatered tailings comprises calcining the dried tailings.
6. The method of any one of the clauses herein, wherein the clay minerals comprise or consist of a kaolin group mineral, and wherein calcining the dewatered tailings comprises heating the dewatered tailings to a temperature no more than 800° C., 750° C., 700° C., 650° C., 600° C., 550° C. or within a range of 800-550° C.
7. The method of any one of the clauses herein, wherein the clay minerals comprise or consist of an illite group mineral, and wherein calcining the dewatered tailings comprises heating the dewatered tailings to a temperature no more than 1000° C., 950° C., 900° C., 850° C., 800° C., 750° C., 700° C., or within a range of 1000-700° C.
8. The method of any one of the clauses herein, wherein the clay minerals comprise or consist of a smectite group mineral, and wherein calcining the dewatered tailings comprises heating the dewatered tailings to a temperature no more than 1000° C., 950° C., 900° C., 850° C., 800° C., 750° C., 700° C., or within a range of 1000-700° C.
9. The method of any one of the clauses herein, wherein the clay minerals comprise or consist of a chlorite group mineral, and wherein calcining the dewatered tailings comprises heating the dewatered tailings to a temperature no more than 1000° C., 950° C., 900° C., 850° C., 800° C., 750° C., 700° C., or within a range of 1000-700° C.

10. The method of any one of the clauses herein, wherein calcining the dewatered tailings comprises heating the dewatered tailings via a heated combustion air stream.

11. The method of any one of the clauses herein, wherein the calcined tailings include a moisture content less than 0.1% by weight.

12. The method of any one of the clauses herein, wherein the calcined tailings include pozzolanic properties.

13. The method of any one of the clauses herein, wherein the calcined tailings are combined with lime and one or more additives to produce a cementitious product having a uniaxial compressive strength at least 7 Megapascals (MPa), 8 MPa, 9 MPa, 10 MPa, 11 MPa, 12 MPa, or 13 MPa.

14. The method of any one of the clauses herein, wherein the calcined tailings are combined with lime and one or more additives to produce a cementitious product having a uniaxial compressive strength that increases over a period of time of at least 28 days.

15. The method of any one of the clauses herein, wherein altering the composition comprises blending or combining one or more additives with the calcined tailings, the additives including at least one of lime, enhanced lime, dolomitic lime, lime kiln dust, quicklime, hydrated lime, cement kiln dust, limestone, argillaceous limestone, natural pozzolans, artificial pozzolans, or gypsum.

16. The method of any one of the clauses herein, wherein the product has a composition comprising a percent calcium oxide within a range of 30-70%, 40-70%, 50-70%, 60-70%, or 60-65%.

17. The method of any one of the clauses herein, wherein the product has a composition comprising a percent magnesium oxide within a range of 0.1-10%, 0.1-6%, 1-6%, or 3-6%.

18. The method of any one of the clauses herein, wherein the product has a composition comprising a percent iron oxide with a range of 0.1-12%, 0.1-8%, or 1-6%.

19. The method of any one of the clauses herein, wherein the product has a composition comprising a percent alumina within a range of 1-15%, 3-10%, or 3-8%.

20. The method of any one of the clauses herein, wherein the product has a composition comprising a percent sulfur trioxide within a range of 0.1-5%, 1-5%, or 1-3%.

21. The method of any one of the clauses herein, wherein the product has a composition comprising a percent silica within a range of 10-30%, 15-30%, or 17-25%.

22. The method of any one of the clauses herein, further comprising, cooling the calcined tailings via ambient air or another cooling source.

23. The method of any one of the clauses herein, wherein the calcining is performed via a calciner, the method further comprising cooling the calcined tailings via a cooling source that absorbs heat from the calcined tailings, wherein the heated cooling source is combined with a heated air stream provided to the calciner for calcining purposes.

24. The method of any one of the clauses herein, wherein the clay minerals comprise at least one of a kaolin group mineral, an illite group mineral, a smectite group mineral, or a chlorite group mineral.

25. The method of any one of the clauses herein, wherein the tailings comprise oil sands tailings and/or originate from oil sands operations.

26. The method of any one of the clauses herein, wherein the tailings comprise mine tailings or originate from mining operations.

27. A method for providing a cementitious product, the method comprising: processing mine waste comprising clay minerals; calcining the processed mine waste to produce calcined mine waste; and altering a composition and/or one or more characteristics of the calcined mine waste to produce a product.

28. The method of any one of the clauses herein, wherein processing the mine waste comprises drying directly or indirectly the mine waste via waste heat from the calcining to produce dried mine waste having a moisture content of no more than 9% by weight, 8% by weight, 7% by weight, 6% by weight, 5% by weight, 4% by weight, 3% by weight, 2% by weight, 1% by weight, or within a range of 6%-1% by weight, and wherein calcining the mine waste comprises calcining the dried mine waste.

29. The method of any one of the clauses herein, wherein the clay minerals comprise or consist of a kaolin group mineral, and wherein calcining the mine waste comprises heating the mine waste to a temperature no more than 800° C., 750° C., 700° C., 650° C., 600° C., 550° C. or within a range of 800-550° C.

30. The method of any one of the clauses herein, wherein the clay minerals comprise or consist of an illite group mineral, and wherein calcining the mine waste comprises heating the mine waste to a temperature no more than 1000° C., 950° C., 900° C., 850° C., 800° C., 750° C., 700° C., or within a range of 1000-700° C.

31. The method of any one of the clauses herein, wherein the clay minerals comprise or consist of a smectite group mineral, and wherein calcining the mine waste comprises heating the mine waste to a temperature no more than 1000° C., 950° C., 900° C., 850° C., 800° C., 750° C., 700° C., or within a range of 1000-700° C.

32. The method of any one of the clauses herein, wherein the clay minerals comprise or consist of a chlorite group mineral, and wherein calcining the mine waste comprises heating the mine waste to a temperature no more than 1000° C., 950° C., 900° C., 850° C., 800° C., 750° C., 700° C., or within a range of 1000-700° C.

33. The method of any one of the clauses herein, wherein calcining the mine waste comprises heating the mine waste via a heated combustion air stream.

34. The method of any one of the clauses herein, wherein the calcined mine waste include a moisture content less than 0.1% by weight.

35. The method of any one of the clauses herein, wherein the calcined mine waste include pozzolanic properties.

36. The method of any one of the clauses herein, wherein the calcined mine waste are combined with lime and one or more additives to produce a cementitious product having a uniaxial compressive strength at least 7 Megapascals (MPa), 8 MPa, 9 MPa, 10 MPa, 11 MPa, 12 MPa, or 13 MPa.

37. The method of any one of the clauses herein, wherein the calcined mine waste is combined with lime and one or more additives to produce a cementitious product having a uniaxial compressive strength that increases over a period of time of at least 28 days.

38. The method of any one of the clauses herein, wherein altering the composition comprises blending or combining one or more additives with the calcined mine waste, the additives including at least one of lime, enhanced lime, dolomitic lime, lime kiln dust, quicklime, hydrated lime, cement kiln dust, limestone, argillaceous limestone, natural pozzolans, artificial pozzolans, or gypsum.

39. The method of any one of the clauses herein, wherein the product has a composition comprising a percent calcium oxide within a range of 30-70%, 40-70%, 50-70%, 60-70%, or 60-65%.

40. The method of any one of the clauses herein, wherein the product has a composition comprising a percent magnesium oxide within a range of 0.1-10%, 0.1-6%, 1-6%, or 3-6%.

41. The method of any one of the clauses herein, wherein the product has a composition comprising a percent iron oxide with a range of 0.1-12%, 0.1-8%, or 1-6%.

42. The method of any one of the clauses herein, wherein the product has a composition comprising a percent alumina within a range of 1-15%, 3-10%, or 3-8%.

43. The method of any one of the clauses herein, wherein the product has a composition comprising a percent sulfur trioxide within a range of 0.1-5%, 1-5%, or 1-3%.

44. The method of any one of the clauses herein, wherein the product has a composition comprising a percent silica within a range of 10-30%, 15-30%, or 17-25%.

45. The method of any one of the clauses herein, further comprising, cooling the calcined mine waste via ambient air or another cooling source.

46. The method of any one of the clauses herein, wherein the calcining is performed via a calciner, the method further comprising cooling the calcined mine waste via a cooling source that absorbs heat from the calcined mine waste, wherein the heated cooling source is combined with a heated air stream provided to the calciner for calcining purposes.

47. The method of any one of the clauses herein, wherein the clay minerals comprise at least one of a kaolin group mineral, an illite group mineral, a smectite group mineral, or a chlorite group mineral.

48. The method of any one of the clauses herein, wherein the mine waste originates from mining operations.

49. A calcining system, comprising:
a dewatering device configured to receive tailings having a pH above 11.5, 11.8 or 12.0 and produce dewatered tailings;
a calciner configured to receive and heat the dewatered tailings to a temperature no more than a predetermined threshold temperature and produce calcined tailings; and
a milling device configured to receive the calcined tailings and produce a milled product having one or more desired particle characteristics.

50. The system of any one of the clauses herein, further comprising a grinding device positioned between the dewatering device and the calciner.

51. The system of any one of the clauses herein, further comprising a dryer positioned between the dewatering device and calciner.

52. The system of any one of the clauses herein, further comprising a dryer positioned between the dewatering device and calciner, the dryer configured to remove moisture from the dewatered tailings to produce dried tailings having a moisture content of no more than 9% by weight, 8% by weight, 7% by weight, 6% by weight, 5% by weight, 4% by weight, 3% by weight, 2% by weight, or 1% by weight, wherein the dryer is configured to receive a waste heat stream used by the calciner.

53. The system of any one of the clauses herein, further comprising a cooler positioned between the calciner and milling device and configured to cool the calcined tailings to a temperature no more than 100° C., 75° C., or 50° C.

54. The system of any one of the clauses herein, further comprising a blending device downstream of the milling device and configured to mix the milled product with at least one of lime, dolomitic lime, lime kiln dust, quicklime, enhanced lime, hydrated lime, cement kiln dust, argillaceous limestone, natural pozzolans, artificial pozzolans, or gypsum to produce a blended cementitious product.

55. The system of any one of the clauses herein, wherein the blended cementitious product has a composition comprising a percent calcium oxide within a range of 30-70%, 40-70%, 50-70%, 60-70%, or 60-65%.

56. The system of any one of the clauses herein, wherein the blended cementitious product has a composition comprising a percent magnesium oxide within a range of 0.1-10%, 0.1-6%, 1-6%, or 3-6%.

57. The system of any one of the clauses herein, wherein the blended cementitious product has a composition comprising a percent iron oxide with a range of 0.1-12%, 0.1-8%, or 1-6%.

58. The system of any one of the clauses herein, wherein the blended cementitious product has a composition comprising a percent alumina within a range of 1-15%, 3-10%, or 3-8%.

59. The system of any one of the clauses herein, wherein the blended cementitious product has a composition comprising a percent sulfur trioxide within a range of 0.1-5%, 1-5%, or 1-3%.

60. The system of any one of the clauses herein, wherein the blended cementitious product has a composition comprising a percent silica within a range of 10-30%, 15-30%, or 17-25%.

61. The system of any one of the clauses herein, wherein the predetermined threshold temperature is 1000° C., 900° C., 800° C., or 700° C.

62. The system of any one of the clauses herein, wherein the tailings comprise clay minerals that include or consist of a kaolin group mineral, and wherein the predetermined threshold temperature is 800° C., 750° C., 700° C., 650° C., 600° C., 550° C. or within a range of 800-550° C.

63. The system of any one of the clauses herein, wherein the tailings comprise clay minerals that include or consist of an illite group mineral, and wherein calcining the dewatered tailings comprises heating the dewatered tailings to a temperature no more than 1000° C., 950° C., 900° C., 850° C., 800° C., 750° C., 700° C., or within a range of 1000-700° C.

64. The system of any one of the clauses herein, wherein the tailings comprise clay minerals that include or consist of a smectite group mineral, and wherein calcining the dewatered tailings comprises heating the dewatered tailings to a temperature no more than 1000° C., 950° C., 900° C., 850° C., 800° C., 750° C., 700° C., or within a range of 1000-700° C.

65. The system of any one of the clauses herein, wherein the tailings comprise clay minerals that include or consist of a chlorite group mineral, and wherein calcining the dewatered tailings comprises heating the dewatered tailings to a temperature no more than 1000°

C., 950° C., 900° C., 850° C., 800° C., 750° C., 700° C., or within a range of 1000-700° C.
66. The system of any one of the clauses herein, wherein the calciner is a rotary or flash calciner.
67. A calcining system, comprising:
a calciner configured to receive and heat mine waste to a temperature no more than a predetermined threshold temperature and produce calcined mine waste; and
a milling device configured to receive the calcined mine waste and produce a milled product having one or more desired particle characteristics.
68. The system of any one of the clauses herein, further comprising a crushing device positioned upstream of the calciner.
69. The system of any one of the clauses herein, further comprising a dryer positioned upstream of the calciner.
70. The system of any one of the clauses herein, further comprising a dryer positioned upstream of the calciner, the dryer configured to remove moisture from the mine waste to produce dried mine waste having a moisture content of no more than 9% by weight, 8% by weight, 7% by weight, 6% by weight, 5% by weight, 4% by weight, 3% by weight, 2% by weight, or 1% by weight, wherein the dryer is configured to receive a waste heat stream used by the calciner.
71. The system of any one of the clauses herein, further comprising a cooler positioned between the calciner and milling device and configured to cool the calcined mine waste to a temperature no more than 100° C., 75° C., or 50° C.
72. The system of any one of the clauses herein, further comprising a blending device downstream of the milling device and configured to mix the milled product with at least one of lime, dolomitic lime, lime kiln dust, quicklime, enhanced lime, hydrated lime, cement kiln dust, argillaceous limestone, natural pozzolans, artificial pozzolans, or gypsum to produce a blended cementitious product.
73. The system of any one of the clauses herein, wherein the blended cementitious product has a composition comprising a percent calcium oxide within a range of 30-70%, 40-70%, 50-70%, 60-70%, or 60-65%.
74. The system of any one of the clauses herein, wherein the blended cementitious product has a composition comprising a percent magnesium oxide within a range of 0.1-10%, 0.1-6%, 1-6%, or 3-6%.
75. The system of any one of the clauses herein, wherein the blended cementitious product has a composition comprising a percent iron oxide with a range of 0.1-12%, 0.1-8%, or 1-6%.
76. The system of any one of the clauses herein, wherein the blended cementitious product has a composition comprising a percent alumina within a range of 1-15%, 3-10%, or 3-8%.
77. The system of any one of the clauses herein, wherein the blended cementitious product has a composition comprising a percent sulfur trioxide within a range of 0.1-5%, 1-5%, or 1-3%.
78. The system of any one of the clauses herein, wherein the blended cementitious product has a composition comprising a percent silica within a range of 10-30%, 15-30%, or 17-25%.
79. The system of any one of the clauses herein, wherein the predetermined threshold temperature is 1000° C., 900° C., 800° C., or 700° C.
80. The system of any one of the clauses herein, wherein the mine waste comprises clay minerals that include or consist of a kaolin group mineral, and wherein the predetermined threshold temperature is 800° C., 750° C., 700° C., 650° C., 600° C., 550° C. or within a range of 800-550° C.
81. The system of any one of the clauses herein, wherein the mine waste comprises clay minerals that include or consist of an illite group mineral, and wherein calcining the mine waste comprises heating the mine waste to a temperature no more than 1000° C., 950° C., 900° C., 850° C., 800° C., 750° C., 700° C., or within a range of 1000-700° C.
82. The system of any one of the clauses herein, wherein the mine waste comprise clay minerals that include or consist of a smectite group mineral, and wherein calcining the mine waste comprises heating the mine waste to a temperature no more than 1000° C., 950° C., 900° C., 850° C., 800° C., 750° C., 700° C., or within a range of 1000-700° C.
83. The system of any one of the clauses herein, wherein the mine waste comprise clay minerals that include or consist of a chlorite group mineral, and wherein calcining the mine waste comprises heating the mine waste to a temperature no more than 1000° C., 950° C., 900° C., 850° C., 800° C., 750° C., 700° C., or within a range of 1000-700° C.
84. The system of any one of the clauses herein, wherein the calciner is a rotary or flash calciner.
85. A method for treating tailings and/or mine waste, the method comprising:
calcining dewatered tailings and/or mine waste to produce a calcined composition; and
combining one or more additives with the calcined composition to produce a blended product,
wherein
the additives comprising at least one of lime, dolomitic lime, lime kiln dust, quicklime, hydrated lime, cement kiln dust, argillaceous limestone, natural pozzolans, artificial pozzolans, or gypsum, and
the product has a composition comprising
a percent calcium oxide within a range of 50-70%, 60-70%, or 60-65%,
a percent magnesium oxide within a range of 0.1-10%, 0.1-6%, 1-6%, or 3-6%,
a percent iron oxide with a range of 0.1-12%, 0.1-8%, or 1-6%,
a percent alumina within a range of 1-15%, 3-10%, or 3-8%,
a percent sulfur trioxide within a range of 0.1-5%, 1-5%, or 1-3%, and
a percent silica within a range of 10-30%, 15-30%, or 17-25%.

BRIEF DESCRIPTION OF THE DRAWINGS

Many aspects of the present technology can be better understood with reference to the following drawings. The components in the drawings are schematic and not necessarily to scale. Instead, emphasis is placed on illustrating the principles of the present technology clearly. A person skilled in the relevant art will understand that the features shown in the drawings are for purposes of illustrations, and variations, including different and/or additional features and arrangements thereof, are possible.

DETAILED DESCRIPTION

I. Overview

Figure 1:
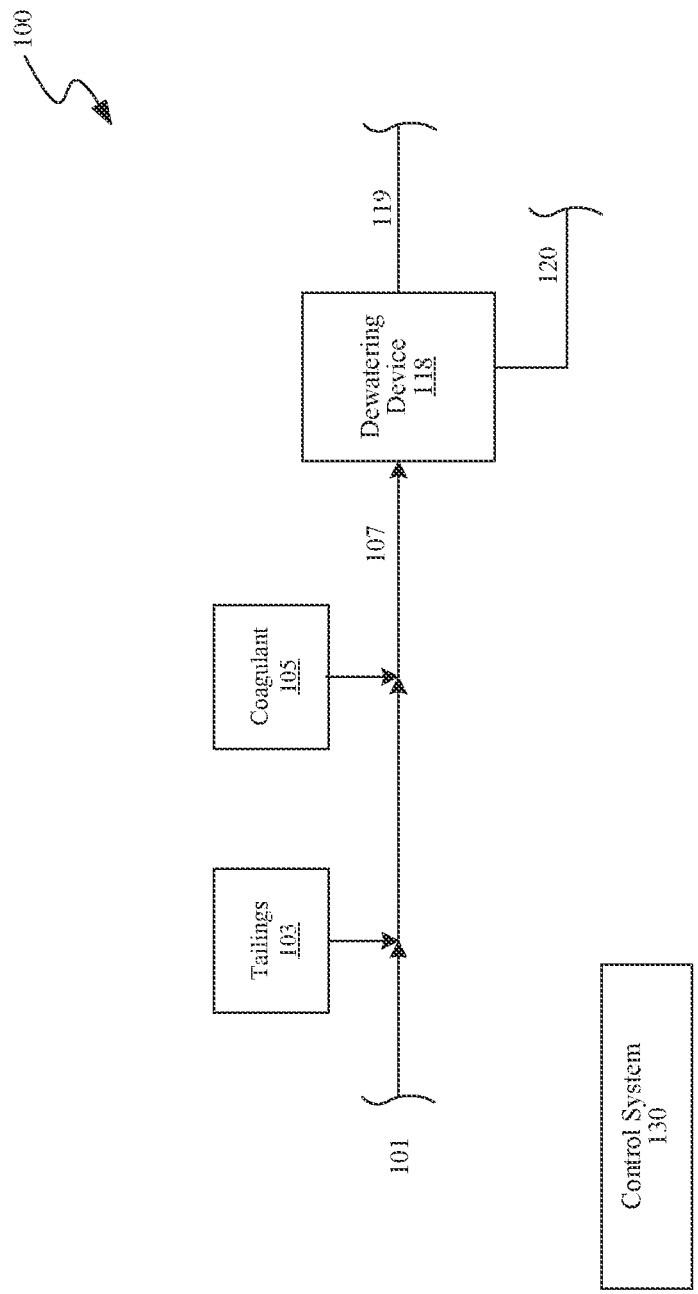
FIG. 1 is a schematic block diagram of a tailings dewatering system, in accordance with embodiments of the present technology.

Fluid tailings originating from mine and oil sands operations are often stored in ponds or holding areas prior to treatment, and can be treated with lime to form dewatered tailings (e.g., tailings cake) that can be reclaimed. For example, as described herein (e.g., with reference to FIGS. 1-2B), tailings can be treated with lime at elevated pH levels and then dewatered via mechanical means to form a dewatered product having at least 40% solids content. By treating the tailings with lime at an elevated pH, pozzolanic reactions between excess calcium supplied by the lime and clay minerals of the tailings are enabled and can thereby form a cementitious matrix. However, while treating the tailings in such a manner is beneficial to reducing the vast amount of fluid tailings, such treatment can be expensive (e.g., due to the dewatering of filtration step(s)) and thus operational economics may act as a barrier.

Mine wastes originating from overburden and/or interburden, such as rock and other solid materials, must be processed to access useable ores. These mine wastes can contain the same clay minerals found in associated mine tailings or may be from different geological members and strata unrelated to the ore zones. Unlike ore, these wastes are not ground as part of the mine's operations but still need to be managed, and still pose environmental and health risks.

Embodiments of the present technology can mitigate such economic issues by further treating the dewatered tailings and/or mine wastes to produce products having economic value for multiple industries. For example, as explained in detail herein, embodiments of the present technology can calcine the dewatered tailings and/or mine waste by heating them to or no more than a predetermined temperature to produce a pozzolanic product suitable for use in the concrete or other industry. In some embodiments, the dewatered tailings and/or mine waste can be processed (e.g., milled or grinded and/or dried) prior to calcining. Additionally or alternatively, the calcined tailings and/or mine waste can be subsequently milled or grinded and/or blended with one or more additives (e.g., lime, enhanced hydrate, dolomitic lime, lime kiln dust, quicklime, gypsum, water, flow aids, etc.) to produce a cementitious blend or other composition having certain desired characteristics (e.g., a particular particle size or particle size distribution). In doing so, compositions of embodiments of the present technology can be used for multiple applications, including as a cement binder (e.g., for mine backfill), as a chemical soil stabilizer (e.g., for roadway sublayers) or as a direct replacement for coal fly ash, which is in short supply due to decommissioning of coal-fired power plants and the like around the world.

As explained in additional detail herein, a method for producing cementitious products from dewatered tailings can comprise processing dewatered tailings comprising clay minerals by crushing the dewatered tailings (e.g., to a powder) and then drying the grinded dewatered tailings such that the moisture content is below a predetermined threshold (e.g., 3%, 2%, or 1% by weight). In some embodiments, the grinded dewatered tailings are dried using waste heat received directly or indirectly from a heated stream used for calcining purposes. In such embodiments, the same heated stream used to calcine the tailings is also used to dry or pretreat the tailings upstream of the calciner. The dried tailings may be directed to a collector unit or to the calciner directly. In some embodiments, the calciner may be configured to heat the dried tailings no more than a predetermined temperature (e.g., 1000° C., 950° C., 900° C., 850° C., 800° C., 750° C., 700° C., 650° C., 600° C., 550° C., or within a range of 1000-550° C.). The calcined tailings may then undergo post-processing, which can include cooling and further grinding to produce a product having one or more desired particle characteristics. As explained herein, in some embodiments, the grinded product may then be blended with one or more additives depending on the desired end application for the product.

As explained in additional detail herein, a method for producing cementitious products from mine waste can comprise processing mine waste comprising clay minerals by grinding the mine waste (e.g., to a powder) and then drying the grinded mine waste such that the moisture content is below a predetermined threshold (e.g., 3%, 2%, or 1% by weight). Alternatively, processing mine waste can comprise drying the mine waste and then grinding the dried mine waste. In some embodiments, the mine waste (e.g., the grinded mine waste) is dried using waste heat received directly or indirectly from a heated stream used for calcining purposes. In such embodiments, the same heated stream used to calcine the mine waste is also used to dry or pretreat the mine waste upstream of the calciner. The dried mine waste may be directed to a collector unit or to the calciner directly. In some embodiments, the calciner may be configured to heat the dried mine waste no more than a predetermined temperature (e.g., 1000° C., 950° C., 900° C., 850° C., 800° C., 750° C., 700° C., 650° C., 600° C., 550° C., or within a range of 1000-550° C.). The calcined mine waste may then undergo post-processing, which can include cooling and further grinding to produce a product having one or more desired particle characteristics. As explained herein, in some embodiments, the grinded product may then be blended with one or more additives depending on the desired end application for the product.

In the figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Systems and Method for Dewatering Tailings

FIG. 1 is a schematic block diagram of a tailings dewatering system 100 ("system 100"), in accordance with embodiments of the present technology. As shown in the illustrated embodiment, the system 100 includes tailings 103, and a coagulant 105 to be combined with the tailings 103. The tailings 103 and coagulant 105 may be combined and/or mixed in-line (as shown in FIG. 1) or via a mixer. The dosage of coagulant 105 combined with the tailings 103 may be at least about 1,000 ppm (e.g., 1000 mg/L), 2,000 ppm, 2,500 ppm, 3,000 ppm, 3,500 ppm, 4,000 ppm, 4,500 ppm, 5,000 ppm, 8,000 ppm, 10,000 ppm, or within a range of 1,000-10,000 ppm on a wet weight of tailings basis. The combined tailings 103 and coagulant 105 produce a mixture 107. In some embodiments, the dosage of coagulant 105 combined with the tailings 103 may be based on a desired pH of the resulting mixture 107. The mixture 107 is provided to a dewatering device 118 that can separate the mixture 107 into a first stream or solution 119 (e.g., a dewatered tailings, product, or "cake") comprising a solids content of at least 40% by weight, and a second stream or solution 120 comprising release water. The first stream 119 can be provided to a downstream system or device for further processing (e.g., as described with reference to FIGS. 3 and 4), and/or to a disposal or holding area (e.g., a pond or diked area). The second stream 120 may be provided as recycle or effluent to another disposal or containment area.

The tailings 103 can be provided from a tailings reservoir (e.g., the tailings reservoir 102 (FIG. 2A), a pond, diked area, tank, etc.), or directly from another process stream 101 (e.g., an extraction process stream, a treatment process stream, etc.) without being routed through the tailings reservoir 102. In some embodiments, the tailings 103 can originate from operations related to oil sands and include the remains of the oil sands operations after extraction of bitumen content. For example, the tailings 103 can include whole-tailings (WT), thin fluid tailings (TFT), fluid fine tailings (FFT), froth treatment tailings (FTT), hydro-cyclone overflow or underflow, thickener underflow, thickened tailings, and/or mature fine tailings (MFT). In some embodiments, the tailings 103 can originate from the extraction of minerals (e.g., copper, iron ore, gold and/or uranium), e.g., from mining operations.

The tailings 103 can have a pH less than about 10.0, 9.0, 8.0 or within a range of 7.0-10.0, 7.5-9.5, or 8.0-9.0. Tailings originating from sources other than oil sands operations can be more alkaline in nature, and thus the pH of such tailings may be less than about 12.5, 12.0, 11.0, or 10.0, or within a range of 10.0-12.5. The composition of the tailings 103 can include water (e.g., extraction water), sand, bicarbonates (e.g., sodium bicarbonate), sulfates, clay, residual bitumen particles, froth treatment diluents, organic polymers, heavy metals, sulfur, and other impurities that are suspended in the water. The clay can include one or more of a kaolin group mineral (e.g., kaolinite, dickite, halloysite, nacrite, antigorite, chamosite, chrysotile, and/or cronstedite), an illite group mineral (e.g., illite and/or glauconite), a smectite group mineral (e.g., montmorillonite, nontronite, saponite, beidellite, hectorite, and/or sauconite), a chlorite group mineral (e.g., brunsvigite, chamosite, clinochlore, cookite, diabantite, nimite, pennantite, penninite, ripidolite, sheridanite, and/or thuringite), vermiculite, sepiolite, and/or palygorskite. In some embodiments, the tailings 103 can include a solids content of at least 5% or within a range of from about 5-40% and a bitumen content of from about 0-3%. The solids content can have a clay content of from about 40-100%. The tailings 103 can be obtained or be provided as a batch process (e.g., intermittently provided from tailings ponds) or as a steady-state extraction process (e.g., continuously provided from oil sands or mining operations, or stepwise feeding in pattern). In some embodiments, the tailings 103 may undergo upstream processing prior to the tailings reservoir, e.g., cyclone separation, screen filtering, thickening and/or dilution processes. Additionally or alternatively, the tailings 103 may be diluted to decrease the solids content thereof. In some embodiments, the tailings 103 may be mixed with sand, overburden, and/or other materials to increase its solids content. Additionally or alternatively, the tailings 103 can also include fermentable or biodegradable organic material that, when anaerobically degraded by microbes, can produce one or more greenhouse gases (GHG) (e.g., methane) or biomass that can emit GHG. Such microbial degradation may occur when the tailings 103 are stored in stagnant conditions, such as in submerged regions in ponds or holding areas, and may only occur when the microbes and organic material are in an anaerobic state.

The coagulant 105 can include lime and/or inorganic materials that provide divalent cations (e.g., calcium), and may be provided from a coagulant reservoir (e.g., a coagulant reservoir 104 (FIG. 2A), a tank, etc.). The lime can include hydrated lime (e.g., calcium hydroxide ($Ca(OH)_2$) and/or slaked quicklime (e.g., calcium oxide (CaO)). In some embodiments, the hydrated lime can include enhanced hydrated lime (e.g., calcium hydroxide particles having a specific surface area of at least 25 $m^2/g$), as described in U.S. patent application Ser. No. 15/922,179, now U.S. Pat. No. 10,369,518, filed Mar. 15, 2018, the disclosure of which is incorporated herein by reference in its entirety. The lime can be part of a slurry such that the lime makes up a portion (e.g., no more than 50%, 40%, 30%, 25%, 20%, 15%, 10%, 5%, 1%, or 0.1% by weight) of the lime slurry. The remainder of the lime slurry can include water (e.g., release water, makeup water, and/or process water). In some embodiments, the lime or lime slurry can include dolomitic lime (e.g., lime including at least 15%, 20%, or 25% magnesium oxide on a non-volatile basis), or a combination of quicklime, limestone (e.g., calcium carbonate ($CaCO_3$)), hydrated lime, enhanced hydrated lime, dolomitic lime, lime kiln dust, gypsum, and/or other lime-containing materials. The lime slurry can have a pH of at least 12.0 or from about 12.0-12.5, e.g., as measured at 25° C.

As previously described, the tailings 103 and the coagulant 105 can be combined in a mixer (e.g., mixer 106 (FIG. 2A)) to produce the mixture 107. In such embodiments, the mixer can be a static mixer, a dynamic mixer, or a T-mixer, and/or can include rotatable blades or other means to agitate the combined tailings 103 and coagulant 105. The residence time in the mixer for the tailings 103 and coagulant 105 can be, e.g., less than about 30 seconds, 60 seconds, 5 minutes. As previously described, in some embodiments the mixer is omitted and the tailings 103 and coagulant 105 can be mixed in-line, e.g., via turbulent flow conditions. In general, the tailings 103 and coagulant 105 are mixed (e.g., via the mixer or in-line) to ensure the mixture 107 has a substantially uniform composition, and a desired pH and/or soluble calcium level.

The pH of the mixture 107 can be at least about 11.5, 11.6, 11.7, 11.8, 11.9, 12.0, 12.1, 12.2, 12.3, 12.4 or 12.5. Additionally or alternatively, the soluble calcium level (i.e., the calcium cations in solution) of the mixture 107 is at least about 40 mg/L, 50 mg/L, 100 mg/L, 200 mg/L, 300 mg/L, 400 mg/L, 500 mg/L, 600 mg/L, 700 mg/L, or 800 mg/L. As explained in additional detail elsewhere herein (e.g., with reference to FIG. 2A), the soluble calcium level of the mixture 107 is in part dependent on the pH of the mixture and/or the bicarbonates present in the tailings 103, which react with the calcium ions and reduce the free soluble calcium concentration. In some embodiments, a pH of from 11.5 to 12.0 enables ion exchange to occur between the tailings 103 and coagulant 105, and can minimize the bicarbonates present in the mixture 107. In practice, the pH of the mixture 107 can be measured, e.g., downstream of where the tailings 103 and coagulant 105 are combined, and used to control the pH and/or soluble calcium level of the mixture 107.

As shown in FIG. 1, the system 100 can further include a control system 130 to control operations associated with the system 100. Many embodiments of the control system 130 and/or technology described below may take the form of computer-executable instructions, including routines executed by a programmable computer. The control system 130 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "control system" as generally used herein refers to any data processor. Information handled by the control system 130 can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Figure 2A:
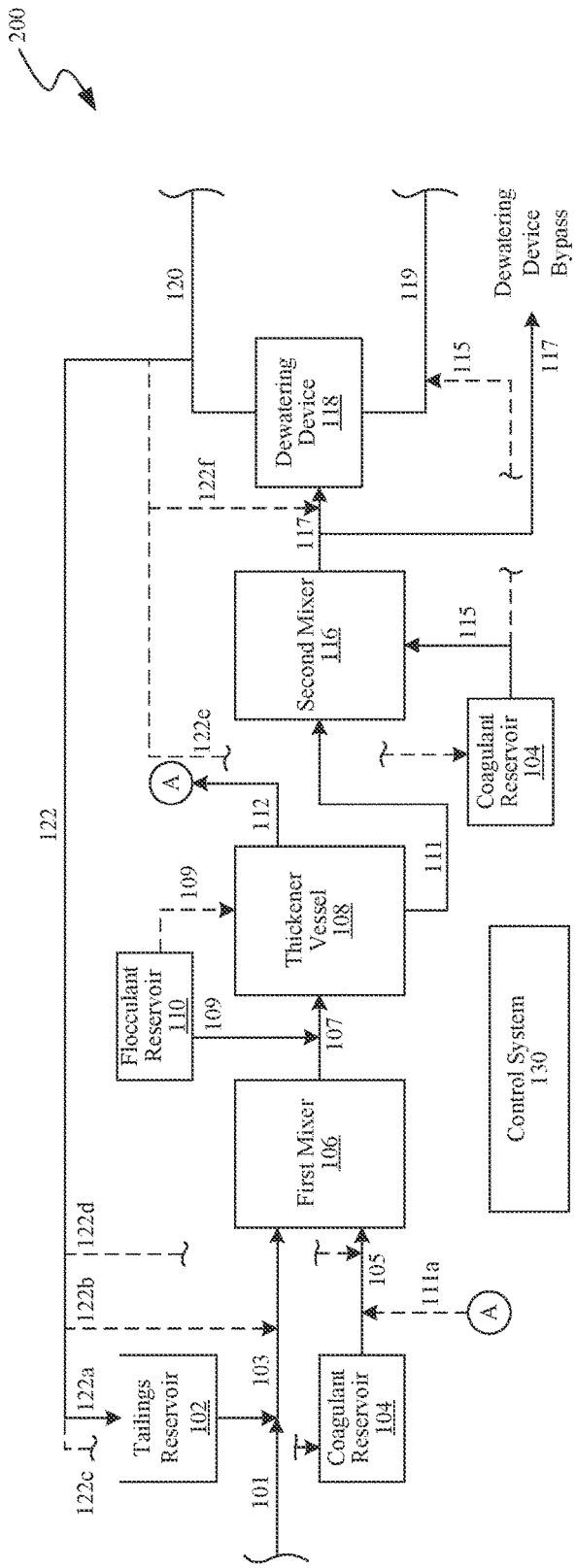
FIGS. 2A and 2B are schematic block diagrams of a tailings dewatering system, in accordance with embodiments of the present technology.
Figure 2B:
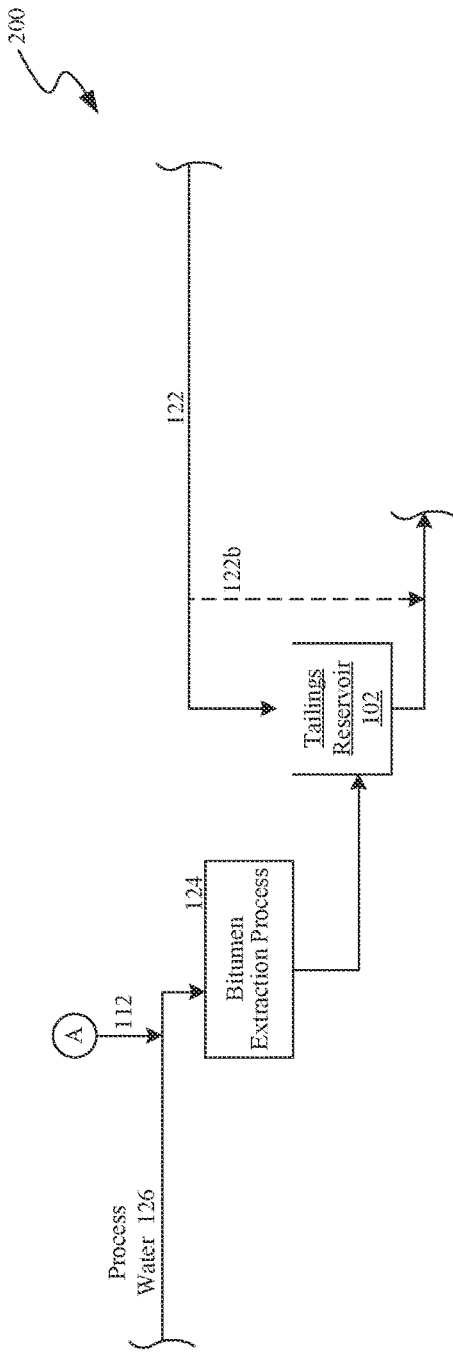

FIGS. 2A and 2B are schematic block diagrams of a tailings dewatering system ("system 200"), in accordance with embodiments of the present technology. The system 200 includes components and elements similar or identical to those described with reference to FIG. 1. For example, the system 200 includes the previously described tailings 103, coagulant 105 (e.g., first coagulant), and mixture 107 (e.g., first mixture), amongst other features, of the system 100.

Combining the first coagulant 105 (e.g., calcium hydroxide) with the tailings 103 (e.g., in the first mixer 106 or in-line) increases the pH of the tailings 103 to be at least about 11.5. At or above a pH of 11.5, bicarbonates present in the tailings 103 can be substantially depleted due to reactions with the calcium hydroxide, as described below. In doing so, the soluble calcium ions needed for cation exchange within the first mixture 107 are reduced. Additionally or alternatively, such a pH can also enable the first coagulant 105 to alter the surface charges of the clay of the tailings 103, which promotes dewatering thereof. Using a coagulant other than calcium hydroxide, such as alum ($Al_2(SO_4)_3$), gypsum ($CaSO_4 \cdot 2H_2O$) and/or calcium chloride ($CaCl_2$), to treat the tailings 103 would not enable the clay of the tailings 103 to release water in the same manner as calcium hydroxide would, at least because reactions between alum, gypsum, and/or calcium chloride and the clay would not produce soluble hydroxides and/or a mixture having a pH of at least 11.5. For example, treating the tailings stream with alum would produce aluminum hydroxides that precipitate to produce hydrogen ions (e.g., as sulfuric acid) that lowers pH. The resulting mixture can have a pH less than 9.0. Such a low pH may inhibit dewatering and/or chemical modification of the clay of the tailings 103, which is generally undesirable. Additionally or alternatively, treating the tailings stream with alum, gypsum, calcium chloride, or other coagulants other than calcium hydroxide would not provide the necessary pH (e.g., a pH of at least about 11.5) to solubilize silicates and aluminates of the tailings stream or promote dewatering in the manner.

Adding the first coagulant 105 including calcium hydroxide to the tailings 103 can cause or enable Reactions 1-4 below to occur within the first mixture 107.

$$Ca(OH)_{2(aq)} + NaHCO_{3(aq)} \rightarrow CaCO_{3(S)} + NaOH_{(aq)} + H_2O \quad \text{(Reaction 1)}$$

$$NaOH_{(aq)} + NaHCO_{3(aq)} \rightarrow Na_2CO_{3(aq)} + H_2O \quad \text{(Reaction 2)}$$

$$Ca(OH)_{2(aq)} + Na_2CO_{3(aq)} \rightarrow CaCO_{3(S)} + 2NaOH_{(aq)} \quad \text{(Reaction 3)}$$

$$Ca(OH)_{2(aq)} \rightarrow Ca^{2+}_{(aq)} + 2OH_{(aq)} \quad \text{(Reaction 4)}$$

Per Reaction 1, when sodium bicarbonate ($NaHCO_3$) in the pore water of the tailings 103 is exposed to calcium hydroxide ($Ca(OH)_2$), calcium cations ($Ca^{2+}$) bond with carbonate ions ($CO_3^{2-}$) and sodium bicarbonate is converted to insoluble calcium carbonate ($CaCO_3$) (also referred to herein as "calcite"), sodium hydroxide (NaOH) and water ($H_2O$). Per Reaction 2, the produced sodium hydroxide from Reaction 1 reacts with sodium bicarbonate to produce sodium carbonate ($Na_2CO_3$) and water. Per Reaction 3, calcium hydroxide of the first coagulant 105 reacts with the produced sodium carbonate from Reaction 2 to produce calcium carbonate and sodium hydroxide. Per Reaction 4, and as a result of the pH of the first mixture 107 being at or above about 11.5 and the carbonate ions of the mixture 107 being substantially depleted, calcium hydroxide can readily solubilize to form calcium cations and sodium hydroxide.

In practice, Reactions 1 and 3 can be limited only by the availability of carbonate ions in the first mixture (i.e., provided by the tailings). As such, Reactions 1 and 3 will reduce the amount of soluble calcium cations available for cation exchange (and pozzolanic reactions) to occur. Stated differently, Reactions 1 and 3 limit the amount of free calcium cations available to react with clays in the first mixture until the carbonate ions are largely depleted and/or removed from the first mixture. As a result of Reactions 1-4, in some embodiments the first mixture may have a soluble calcium level of no more than 100 mg/L, 90 mg/L, 80 mg/L, 70 mg/L, 60 mg/L, 50 mg/L, 40 mg/L, 30 mg/L, or within a range of 100-30 mg/L on a wet weight of tailings basis.

In some embodiments, the first mixture 107 can be combined with a flocculant 109. The flocculant 109 can include one or more anionic, cationic, nonionic, or amphoteric polymers, or a combination thereof. The polymers can be naturally occurring (e.g., polysaccharides) or synthetic (e.g., polyacrylamides). In some embodiments, the flocculant 109 can be added as a part of a slurry, which may include less than 1% (e.g., about 0.25%) by weight of the flocculant 109, with the substantial remainder being water (e.g., process water, release water, and/or makeup water). In some embodiments, at least one component of the flocculant 109 will have a high molecular weight (e.g., up to about 50,000 kilodaltons). In some embodiments, the flocculant 109 will have a low molecular weight (e.g., below about 10,000 kilodaltons) and/or a medium or high charge density.

As shown in FIG. 2A, the flocculant 109 can be provided from a flocculant reservoir 110 (e.g., a tank or reservoir), and can be combined with the first mixture 107 in-line and/or in a thickener vessel 108 (e.g., a tank or reservoir). The vessel 108 can form, via separation of the first mixture 107, (i) a second mixture 111 including a thickened composition having less water content than that of the first mixture 107, and (ii) process water 112. Without being bound by theory, separation of the first mixture 107 into the second mixture 111 and the process water 112 is promoted at least in part by the pH of the first mixture 107 being at least 11.5 and/or the coagulant 105 including calcium hydroxide which alters the surface charges of the clay of the tailings 103 to promote dewatering. In some embodiments, addition of the flocculant 109 to the first mixture 107 is omitted.

The second mixture 111 can include similar solid minerals, pH and soluble calcium level to that of the first mixture 107 and/or the tailings 103. The process water 112 can be recycled or routed to a separate process (e.g., for bitumen extraction), and the second mixture 111 can be routed to further downstream processing. By separating the second mixture 111 and process water 112, the vessel 108 decreases the volume, or more specifically, the amount of water, in the second mixture 111. As such, the overall volume to be processed by downstream equipment (e.g., the dewatering device 118) is decreased. Accordingly, an overall higher volume of the tailings 103 can be processed by the system 200 relative to systems that do not remove the process water 112 in such a manner. Additionally, separation of the second mixture 111 and process water 112 from one another can decrease overall cycle time of the system 200.

As described in detail elsewhere herein, the flocculant 109 can promote thickening (e.g., increasing the solids content) of the second mixture 111, e.g., by forming bonds with colloids in the vessel 108, e.g., that were originally provided via the tailings 103. That is, the flocculant 109 can bond with the clay present in the tailings 103 to form a floc that is physically removed from the rest of the mixture. In doing so, the flocculant 109 also aids the mechanical separation of free water from the mixture. In some embodiments, the amount of flocculant 109 added to the first mixture 107 is based at least in part on solids content of the second mixture 111 and/or process water 112. For example, the flocculant 109 may be added to the mixture 107 and/or vessel 108 such that (i) the solids content of the second mixture 111 is greater than a predetermined threshold (e.g., 30%) and/or (b) solids content of the process water 112 is less than a predetermined threshold (e.g., 3%). That is, if the second mixture 111 has a solids content less than 30% solids by weight, the amount of flocculant 109 added to the first mixture 107 and/or vessel 108 may be increased, and/or if the process water 112 has a solids content greater than 3% solids by weight, the amount of flocculant 109 added to the mixture 107 and/or vessel 108 may be increased.

The process water 112 can include hydroxides (e.g., sodium hydroxide), bicarbonates from the tailings 103, and/or other compounds formed as byproducts of reacting the coagulant 105 with the tailings 103. As shown in FIG. 2A, the process water 112 can be used as a dilutant, e.g., by combining the process water 112 with the coagulant 105 to form the lime slurry previously described. Additionally or alternatively, as shown in FIG. 2B, the process water 112 can be directed toward and used to promote bitumen extraction, e.g., by combining the process water 112 with other process water 126. In some extraction processes for oil sands operations, the process water 126 can be supplemented/treated with sodium particles (Nat) to aid the release of bitumen from the oil sands ore. Accordingly, one advantage of routing the process water 112 to treat or mix with the process water 126 is the ability to decrease any supplement addition of sodium particles. Additionally, since the process water 112 is at least slightly alkaline due to the excess hydroxide ions present therein, recycling the process water 112 to the extraction process can increase the pH of the oil sand ore and thereby improve bitumen extraction efficiency for the system 200. Yet another advantage of recycling the process water 112 is that heat is already present in the process water 112, and thus recycling it may require less downstream heating requirements compared to using just the process water 126. Yet another advantage of recycling the process water 112 is removing the volume of the process water 112 from the second mixture 111, which increases the solids content of the second mixture 111 and minimizes the overall volume of material that needs to be dewatered, e.g., via dewatering device 118. This decrease in volume can increase overall throughput of the system 200, thereby decreasing time and costs associated with operating the dewatering device 118.

As shown in FIG. 2A, the second mixture 111 can be combined with a second coagulant 115 in a second mixer 116 to form a third mixture 117. In some embodiments, the second mixer 116 may be omitted, and the second mixture 111 and the second coagulant 115 are combined in-line (e.g., via turbulent flow or belt blending). The second coagulant 115 can be provided from a coagulant reservoir 104 and can be similar or identical to the first coagulant 105 previously described. Accordingly, the second coagulant 115 may include lime and be a lime slurry such that the lime makes up a portion (e.g., no more than 50%, 40%, 30%, 25%, 20%, 15%, 10%, or 5% by weight) of the lime slurry. The second mixer 116 can be identical or similar to the first mixer 106 previously described.

Adding the second coagulant 115 to the second mixture 111 increases the pH and soluble calcium level (i.e., the amount of calcium cations present) in the third mixture (e.g., via Reaction 4). The increase in the soluble calcium level of the third mixture relative to that of the first and second mixtures is due in part to the removal of bicarbonates via Reactions 1 and 2 that previously occurred after the first coagulant 105 was added to the first mixer 106. As such, the additional calcium cations provided via the second coagulant 115 result in a higher soluble calcium level since the calcium ions are not being consumed by the bicarbonates, which are no longer present or are present in smaller quantities relative to the first and second mixtures. The third mixture can have a pH of at least 12.0, 12.1, 12.2, 12.3, 12.4, or 12.5, and/or a soluble calcium level of at least 300 mg/L, 400 mg/L, 500 mg/L, 600 mg/L, 700 mg/L or 800 mg/L. In some embodiments, the pH of the third mixture is within a range of from about 12.0-12.5, and the soluble calcium level of the third mixture is within a range of from about 300 mg/L-800 mg/L, 300 mg/L-700 mg/L, 400 mg/L-600 mg/L, 450 mg/L-550 mg/L, or other incremental ranges between these ranges.

In some embodiments, increasing the pH of the second mixture 111, or more specifically, the tailings portion of the second mixture 111, above 12.0 may decrease the amount of microbes present in the second mixture 111 (and/or tailings portion) by creating an alkaline environment in which the microbes cannot survive, or at least not flourish. As previously described, the microbes present in the tailings 103 can anaerobically degrade organic material of the untreated tailings 103 to produce biomass methane and/or other GHG which may be released to the atmosphere. An advantage of embodiments of the present technology is that, by increasing the pH of the second mixture 111 to be above 12.0, the microbes may be unable to survive and thus the amount of methane or GHG produced by the microbes is decreased. Soluble calcium ions present in the water at a pH above 12 can react with carbon dioxide in solution as bicarbonates or carbonates released from microbial activity, e.g., to sequester carbon dioxide as insoluble calcium carbonates.

Other coagulants, such as alum, gypsum, and calcium chloride do not provide the chemical environment to capture carbon dioxide as described above. For tailings treated with gypsum or calcium chloride, for example, though some insoluble calcium carbonates can be formed, the calcium cations from these compounds will generally solubilize as bicarbonates at a lower pH (i.e., less than 11.5) and their addition to tailings will not enable the pH of the treated mixture to rise above 10.0 to facilitate pozzolanic reactions and dewatering. For tailings treated with alum ($Al_2(SO_4)_3$), sulfuric acid is produced which actively decreases pH of the treated mixture. As a result of not having a sufficiently high pH to drive the reaction for form insoluble calcium carbonates, calcium released by cation exchange forms soluble calcium sulfate and bicarbonate. As pH decreases, carbon dioxide can be released as a gas, thus further lowering pH and resulting in additional greenhouse gas emissions. Furthermore, treating tailings with alum, gypsum, and/or calcium chloride are unable to raise pH to a high level where microbes count is reduced or their activity hindered. Instead these coagulants reduce pH providing better conditions for anaerobic microbial activity.

An advantage of the adding the first coagulant 105, flocculant 109, and second coagulant 115 in a step-wise manner, as opposed to adding only a single coagulant, is the decreased cycle time of the overall system 200. That is, adding the flocculant 109 (after adding the first coagulant 105) to the vessel 108 allows the flocculant 109 to flocculate the solution in the vessel 108 without the significant presence of soluble calcium ions, which results in a more desirable floc formation and improved settling of solids in the second mixture 111. Additionally, since the second coagulant 115 is combined with the second mixture 111 after removing bicarbonates (e.g., via the process water 112 and/or first mixer 106), the bicarbonates do not limit the effectiveness of the second coagulant 115 to promote pozzolanic reactions, as may be the case if only a single lime dosage was used.

As further shown in FIG. 2A, the third mixture 117 is conveyed (e.g., via gravity and/or a pump) from the second mixer 116 to the dewatering device 118, or to other treatment processes, e.g., via a dewatering device bypass. The other treatment processes can include, e.g., thin lift deposition, thick lift deposition, deep deposition, or water-capping technologies. The dewatering device 118 can include a centrifuge, a filtration device or system, in-line flocculation and/or other similar devices or systems that provide a physical separation force on the second mixture 117 to promote dewatering. The dewatering device 118 can separate the second mixture 117 into the first stream 119 and the second stream 120 (e.g., a centrate or a filtrate), as previously described with reference to FIG. 1. Embodiments including a centrifuge can include a scroll centrifugation unit, a solid bowl decanter centrifuge, screen bowl centrifuge, conical solid bowl centrifuge, cylindrical solid bowl centrifuge, a conical-cylindrical solid bowl centrifuge, or other centrifuges used or known in the relevant art. Embodiments including a filtration device or system can include a vacuum filtration system, a pressure filtration system, belt filter press, or other type of filtering apparatus known in the relevant art. In some embodiments, the filtration system can include a Whatman 50, 2.7 micron filter or similar device able to subject the second mixture 117 to at least about 20 psig of air pressure.

In those embodiments including the second mixer 116, the third mixture 117 may be transferred to the dewatering device 118 immediately after mixing in the second mixer 116 (e.g., based on a measured composition taken at an outlet of the second mixer 116), or after a predetermined period of time. In some embodiments, the residence time of the third mixture 117 in the second mixer 116 may be less than 5 minutes, 30 minutes, or one hour. In some embodiments, the third mixture 117 may be retained for more than one hour, e.g., one day, one week, one month, or longer, e.g., to ensure it has been sufficiently modified for the dewatering device 118 by separating a sufficient or optimal amount of water from the solids of the third mixture 117.

The dewatering device 118 has a first outlet that receives the first stream 119, and a second outlet that receives the second stream 120. The first stream 119 can be a solid, soft solid, cake, or pumpable fluid material composed of the some or all of the particulate matter provided via the tailings 103, such as sand, silt, (chemically modified) clay, and residual bitumen and froth treatment diluent, as well as soluble calcium ions provided via the first and second coagulants 105, 115. The first stream 119 can include a solids content of at least 40%, 45%, 50%, 55%, 60%, 65%, 70%, 75%, 80%, 85%, 90%, 95%, or within a range of 40-95% by weight. More generally, the first stream 119 may include a greater percentage of solids by weight than the percentage of liquids by weight. Characteristics (e.g., geotechnical characteristics) of the first stream are described in additional detail with reference to U.S. application Ser. No. 15/566,578 (incorporated by reference herein). The first stream 119 may be provided to a pond or holding area (e.g., a diked area, temporary storage, and/or reclamation area) via a pump, belt, truck, and/or other conveying system(s). In some embodiments, the mixture 117 can be placed on one or more pads in thin/thick lifts to consolidate and dry the solids content contained therein.

In some embodiments, the first stream 119, which may be alkaline thickened tailings or stackable mine tailings, can exist in an aerobic state or condition. Additionally, the first stream 119 can include fermentable or biodegradable organic material (as previously described), and microbes able to aerobically digest or degrade the organic material. The microbes present in the first stream 119 may be the same or different than the microbes present in the untreated and/or fluid tailings 103, as previously described. In some embodiments, the microbes of the first stream 119 can aerobically degrade the organic material of the first stream 119 to produce carbon dioxide (e.g., biomass carbon dioxide). In such embodiments, the produced carbon dioxide may be sequestered by the first stream 119 and used to produce a stable mineral, such as calcium carbonate ($CaCO_3$) according to Reaction 7. That is, carbon dioxide produced via aerobic digestion of an organic material of the first stream 119 can react with calcium hydroxide (e.g., excess soluble calcium ions) present in the first stream 119 to produce calcium carbonate and water. As such, the produced carbon dioxide may not be released to the atmosphere, as would occur if excess calcium ions were not present and/or if the pH of the first stream 119 was less than about 12.0. Instead, according to embodiments of the present technology, the produced carbon dioxide may be used to form stable minerals (e.g., calcium carbonate) for industrial uses. Accordingly, an advantage of embodiments of the present technology, in addition to those previously described, is the ability to prevent the release of carbon dioxide from treated tailings and to produce stable minerals.

$$Ca(OH)_2 + CO_2 \rightarrow CaCO_3 + H_2O \quad \text{(Reaction 7)}$$

The second stream 120 can include a solids content less than 10%, 5%, 4%, 3%, 2%, or 1% by weight. The solids content may include particulate matter such as sand, silt, clay, carbonates, residual bitumen and froth treatment diluent, and/or calcium compounds or particles. The second stream 120 can be directed to a pond or holding area different than the first stream 119, and/or be used as recycle 122. As shown in FIG. 2A, the recycle 122 can be combined with (a) the tailings reservoir 102 via line 122a, (b) the tailings 103 via line 122b, (c) the coagulant reservoir 104 via line 122c, (d) the first coagulant 105 via line 122d, (e) the coagulant reservoir 114 via line 122e, and/or (f) the second mixture 117 via line 122f. Advantageously, combining the recycle 122 with the tailings 103 can increase the pH of the tailings 103, which can enable soluble calcium cations of the recycle 122 to react with bicarbonates present in the tailings 103 and thereby form insoluble compounds that precipitate out of solution and separate from the tailings 103. Reducing the amount of bicarbonates in the tailings 103 can reduce the amount of the first and second coagulants 105, 115 needed for enhanced dewatering to occur, which in turn can reduce operation costs for the system 200. In some embodiments, the second stream 120 may also be treated with carbon dioxide to reduce the pH and/or the amount of soluble calcium cations of the second stream 120. This can be done by natural absorption of carbon dioxide from the atmosphere, or actively injecting carbon dioxide (e.g., from industrial emissions such as flue gas from coal, natural gas, or petroleum coke fired boilers) into the second stream 120. Carbon dioxide lowers the pH of the process water by the formation of carbonic acid, which removes soluble calcium by forming insoluble calcium carbonate. The reaction of carbonic acid also reacts with sodium hydroxides in the second stream 120 resulting in the formation of sodium bicarbonates as the pH decreases. Sodium bicarbonate, removed by hydrated lime in Reaction 1 above, provides a chemical buffer system to moderate the impact of pH changes on the system.

The system 200 can include the control system 130, as previously described with reference to FIG. 1. The control system 130 can be used to control operation of the system 200. For example, the control system 130 can control (e.g., regulate, limit and/or prevent) the flow of fluids (e.g., tailings 103, first coagulant 105, first mixture 107, flocculant 109, second mixture 111, second coagulant 115, third mixture 117, first stream 119, second stream 120, recycle 122, etc.) to and/or from different units (e.g., tailings reservoir 102, coagulant reservoir 104, first mixer 106, vessel 108, flocculant reservoir 110, second mixer 116, dewatering device 118, etc.) of the system 200. Additionally, the control system 130 can control operation of individual units (e.g., the first mixer 106, second mixer 116, dewatering device 118, etc.).

III. Systems and Method for Calcining Tailings and/or Mine Waste

As previously described, there currently exists significant mine waste and over a billion cubic meters of FFT/MFT stored in tailings ponds due to oil sands extraction alone. To mitigate issues associated with this massive volume, embodiments of the present technology include methods and systems for decreasing the current volume of fluid tailings and mine waste, and/or preventing the increase in fluid tailings stored in ponds and mine waste worldwide. As explained herein, embodiments of the present technology can treat dewatered tailings and/or mine waste to produce a calcined, solid product that has economic value and does not need to be later reclaimed. In doing so, embodiments of the present technology can significantly reduce the costs associated with the handling or storage of current fluid tailings and/or mine waste, as well as limit the environmental liability and carbon footprint attributed to the fluid tailings and/or mine waste. Additionally, by creating a product from these tailings and mine waste that has value, the dewatered tailings and mine waste can also be used as a potential revenue stream.

Figure 3:
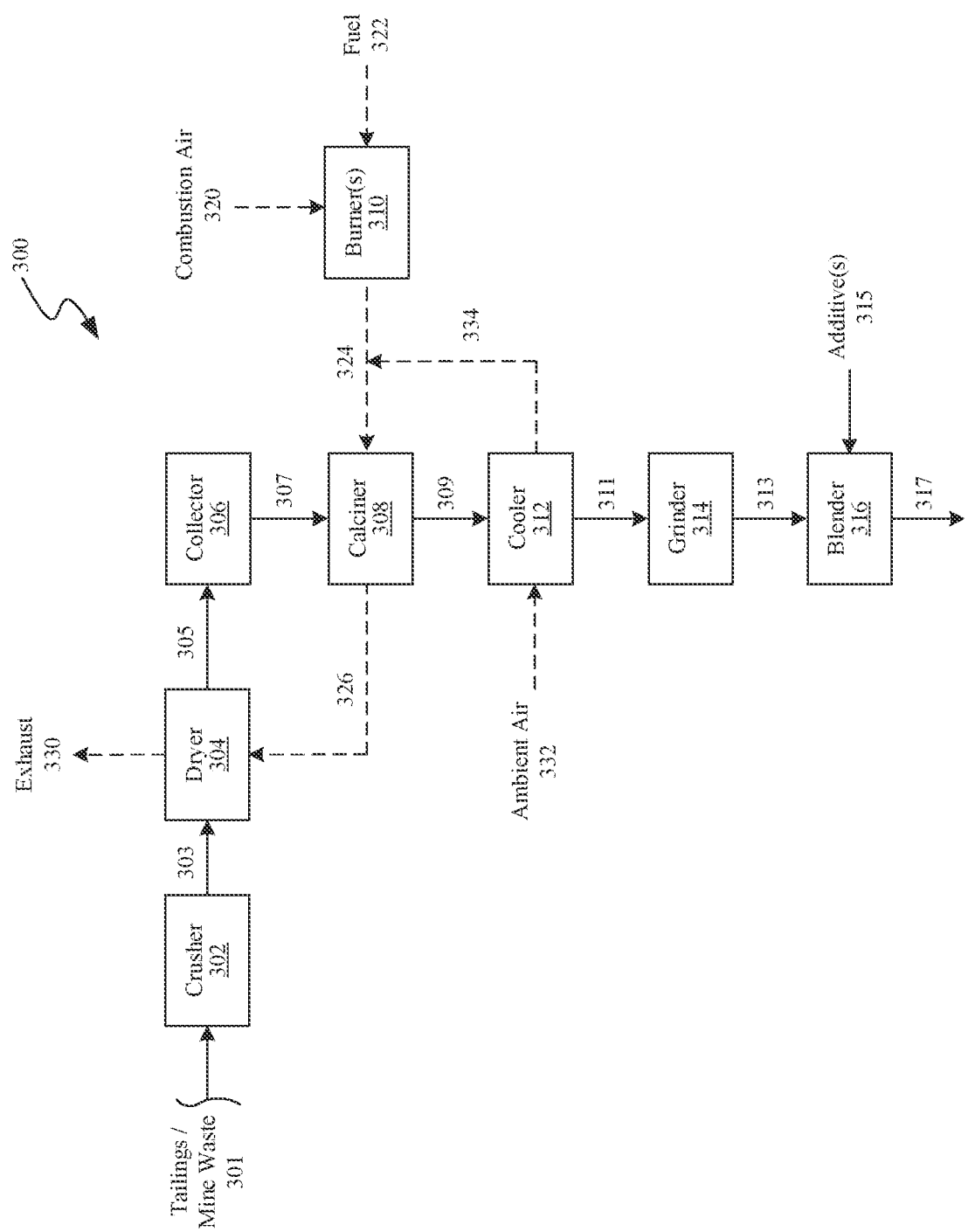
FIG. 3 is a schematic block diagram of a calcining system, in accordance with embodiments of the present technology.

FIG. 3 is a schematic block diagram of a calcining system 300, in accordance with embodiments of the present technology. As shown in FIG. 3, the system 300 can include (i) a calciner 308, (ii) a pre-calcining subsystem upstream of the calciner 308 and including a crusher 302 configured to receive tailings (e.g., dewatered tailings) and/or mine waste 301, a dryer 304, and a collector 306, and (iii) a post-calcining subsystem downstream of the calciner 308 and including a cooler 312, a grinder 314, and a blender or blending unit 316. As noted elsewhere herein, in some embodiments, one or more aspects of the system 300 (e.g., the crusher 302, the dryer 304, the collector 306, the cooler 312, the grinder 314, the blender 316, etc.) may be omitted in particular embodiments, and/or additional aspects may be included depending on the desired end product.

In some embodiments, the dewatered tailings 301 can be provided to the pre-calcining subsystem and/or the calciner 308 immediately after (e.g., less than 30 minutes, 60 minutes, 6 hours, 12 hours, or 24 hours) dewatering occurs. Doing so can inhibit pozzolanic reactions from proceeding, and thereby inhibit or prevent reactive silica and/or alumina present in the dewatered tailings 301, and necessary for calcining purposes, from being consumed via the pozzolanic reactions.

The dewatered tailings 301 provided to the crusher 302 can be the dewatered tailings 119 described with reference to FIG. 1 or 2A. As such, the dewatered tailings 301 (e.g., the mine waste) can include a pozzolan and a pH above 11.5, 11.8, 12.0, 12.5, or within a range of 11.5-12.5. Additionally or alternatively, the dewatered tailings 301 can include a solids concentration of at least 40%, 50%, 60%, 70%, 80%, 90%, or within a range of 40-90% by weight. Additionally or alternatively, the dewatered tailings 301 can have a moisture content of at least 10%, 20%, 30%, 40%, 50%, 60%, or within a range of 10-60% by weight. Additionally or alternatively, the dewatered tailings 301 can be blended with lime, lime kiln dust (LKD), or other additives to provide a cementitious binder that can develop a shear strength (e.g., of at least 5.0 MPa) that increases over a period of time. In some embodiments, the dewatered tailings 301 can comprise tailings treated via a process different than that described with reference to FIGS. 1 and 2A. For example, the dewatered tailings 301 may not have been previously treated with lime.

The crusher 302 can receive the dewatered tailings 301 (and/or mine waste) to provide a crushed dewatered tailings 303 (and/or crushed mine waste), e.g., to the dryer 304. The crusher 302 can be a mill (e.g., a grinding mill, an impact mill, attritor cell mill, etc.) or other device(s) configured to break particles of the dewatered tailings 301 into smaller particles (e.g., a powder) via grinding or crushing. Breaking such particles into smaller particles can increase reactivity of the calcined product, and expose additional surface area to thereby aid in decreasing residence time in the calciner 308. In doing so, energy costs and greenhouse gas emissions associated with the calcining process can be decreased. Additionally or alternatively, crushing the dewatered tailings 301 (and/or mine waste), e.g., into a powder-like form or smaller particles can enable more efficient calcination, e.g., via flash calcination which generally cannot process large particles on a consistent-throughput basis. The crusher 302 can be configured such that the produced crushed tailings 303 (and/or crushed mine waste) have one or more desired characteristics (e.g., a D10, D90, ratio of D90:D10 (i.e., steepness), particle size distribution, max particle size, etc.) depending on the particular end application for the calcined tailings (and/or calcined mine waste). For example, in some embodiments at least 90%, 95%, or 99% of the crushed tailings 303 (and/or crushed mine waste) can have a particle size no more than 74 microns and/or passing 200 mesh. Additionally or alternatively, in some embodiments at least 80% or 90% of the crushed tailings 303 can have a particle size no more than 45 microns and/or passing 325 mesh. Such characteristics may directly correlate to time spent in the crusher 302. In some embodiments, the crusher 302 can include one or more air classification units, e.g., to expose a drying fluid (e.g., waste heat combustion air) to the tailings (and/or mine waste) in the crusher 302.

The dryer 304 is positioned downstream of the crusher 302. In some embodiments, the dryer 304 is upstream of the crusher 302, which can decrease free moisture content of the tailings prior to crushing, and thereby inhibit the crusher 302 from plugging. Additionally, in some embodiments the dryer 304 is incorporated with the crusher 302. In such embodiments, the drying and crushing of the dewatered tailings 301 (and/or crushed mine waste) may be performed simultaneously by a single device. The dryer 304 can be configured to produce dried tailings 305 (and/or dried mine waste) having moisture content no more than 5%, 4%, 3%, 2%, 1%, 0.5%, 0.1%, or within a range of no more than 5-0.1% by weight. Additionally or alternatively, drying the dewatered tailings 301 (and/or mine waste) can dehydroxylate or remove hydroxyl groups from the clay minerals of the dewatered tailings 301 (and/or mine waste), thereby enhancing the downstream calcining process by producing more active silicates and aluminates. In some embodiments, a lower moisture content can decrease the residence time, and therein the energy costs, associated with later calcining the dried tailings 305 (and/or dried mine waste). In some embodiments, the temperature of the crushed tailings 303 (and/or crushed mine waste) received by the dryer 304 is ambient temperature (e.g., 25° C.) and the dried tailings 305 (and/or dried mine waste) exiting the dryer 305 is at least 65° C., 80° C., 95° C., 110° C., 125° C., 140° C., 150° C., or within a range of 65-150° C. In operation, it may be desired to have the temperature of the dried tailings 305 (and/or dried mine waste) be relatively consistent (e.g., vary no more than 10° C.), and as high as possible such that energy losses (e.g., from the waste heat stream 326) are minimized. Increasing the temperature of the dried tailings 305 (and/or dried mine waste) can limit the residence time of the tailings (and/or mine waste) in the calciner, thereby improving overall energy efficiency.

Mechanisms for drying the received crushed tailings 303 (and/or crushed mine waste) can include exposing (e.g., directly or indirectly exposing) the crushed tailings 303 (and/or crushed mine waste) to a heated fluid source. As shown in FIG. 3, the heated fluid source can comprise a waste heat stream 326 that was previously used for calcining purposes within the calciner 308. In such embodiments, the waste heat stream 326 can be routed through the dryer 304 and then vented to the atmosphere as exhaust 330, e.g., via an exhaust stack. In some embodiments, an induced draft fan may be provided downstream of the dryer 304 to provide a driving force for the waste heat stream 326, exhaust 330, etc. In some embodiments, the temperature of the exhaust 330 may be no more than 150° C. or 120° C.

The dried tailings 305 (and/or dried mine waste) can be provided to the collector 306 positioned upstream of the calciner 308. In some embodiments, the collector 308 may be omitted and the dried tailings 305 (and/or dried mine waste) may be provided directly to the calciner 308. The collector 306 can effectively act as a buffer vessel or intermediate storage to ensure a constant, substantially uninterrupted supply of tailings (and/or mine waste) to the calciner 308, which can increase overall throughput and limit unnecessary process interruptions. The characteristics (e.g., particle size, particle size distribution, temperature, etc.) of the dried tailings 305 (and/or dried mine waste) and the tailings 307 (and/or mine waste) provided from the collector can be substantially the same.

As shown in FIG. 3, the calciner 308 is positioned downstream of the dryer 304 and/or collector 306. In some embodiments, the dryer 304 is incorporated within the calciner 308, and/or the calciner 308 comprises one or more preheating stages that the tailings 307 (and/or mine waste) pass through prior to being calcined. The calciner 308 is configured to heat the received tailings 307 (and/or mine waste) in the presence of air or oxygen to a particular temperature (e.g., below the melting point of the tailings 307 (and/or mine waste)) to produce calcined tailings 309 (and/or calcined mine waste). In some embodiments, the tailings 307 (and/or mine waste) are heated to a temperature of no more than 550° C., 600° C., 650° C., 700° C., 750° C., 800° C., 900° C., 1000° C. or within a range of 550-1000° C. Without being bound by theory, limiting the temperature at which the tailings 307 (and/or mine waste) are heated can inhibit or prevent damage to the crystal structure of the tailings 307 (and/or mine waste) and therein ensure pozzolanic activity and/or strength development of the resulting calcined tailings 309 (and/or calcined mine waste) is maintained and not unnecessarily decreased. Additionally, the calciner 308 is operated at a high enough temperature to cause sufficient dehydroxylation of the tailings 307 (and/or mine waste). Additionally or alternatively, the calciner 308 can be operated at as high a temperature as possible without damaging the crystal structure of the tailings 307. Calcining the tailings 307 (and/or mine waste) can include decreasing moisture content of or dehydroxylating the tailings 307 (and/or mine waste), thermally decomposing the tailings 307 (and/or mine waste) such that the clay minerals are dehydroxylated to produce active silicates and aluminates and that at least a portion of the carbon is removed from the tailings 307 (and/or mine waste) (e.g., as carbon dioxide), and/or oxidizing the tailings 307 (and/or mine waste) (e.g., to remove organic impurities such as bitumen, treatment additives, polymers, napthenic acids, etc.). In doing so, the number of end applications for which the calcined tailings (and/or mine waste) may be used increases.

The calciner 308 can include a rotatable calcining vessel or chamber, in which the tailings 307 (and/or mine waste) are directly heated (e.g., via preheated air) and/or indirectly heated (e.g., via a radiant heating source). In some embodiments, airflow through the calciner 308 carries the tailings 307 (and/or mine waste) out the top of the calciner 308 with the process air (e.g., if the tailings 307 are fine). In some embodiments, the calciner 308 is a vertically-oriented gas suspension calciner, with the tailings 307 (and/or mine waste) fed through an upper portion of the calciner 308 and exiting a bottom portion of the calciner 308, and air injected in a counter-current manner at the bottom portion of the calciner 308 and exiting the upper portion of the calciner 308. In such embodiments, as the tailings 307 (and/or mine waste) drop through the calcining chamber, the counter—current air flow and/or rotating vessel can introduce turbulence and sufficient mixing to produce an environment with a substantially uniform temperature or uniform temperature profile throughout the calcining chamber. Additionally or alternatively, the calciner 308 can comprise a flash calcination unit such that temperature of the calciner 308 or portion thereof (e.g., the calcining chamber) is heated rapidly (e.g., at a rate greater than 1000° F./second) and individual particles are calcined in a relatively short period of time (e.g., less than 5 seconds, 1 second, 0.1 seconds, or within a range of 5-0.1 seconds).

As shown in FIG. 3, the heat source or at least part of the heat source for calcining the tailings 307 (and/or mine waste) in the calciner 308 can be provided via a heated air steam 324. Fuel 322 and combustion air 320 can be provided to one or more burners 310 and the produced heated air stream 324 can be provided to the calciner 308. Temperature of the heated air stream 324 can be about or no more than 600° C., 650° C., 700° C., 750° C., 800° C., 900° C., 1000° C., 1100° C., 1200° C., 1300° C., 1400° C., 1500° C., or 1600° C., or within a range of 600-1600° C., and the temperature of the waste heat stream 326 can be about or no more than 350° C., 400° C., 450° C., 500° C., 550° C., 650° C., 800° C., or within a range of 350-800° C. The temperature of the heated air stream 324 may in large part be determined by the operating conditions of a particular facility, e.g., to take into account the ambient environment and heat loss.

The calcined tailings 309 (and/or calcined mine waste) can have a moisture content of no more than 0.1% by weight, and pozzolanic properties such that, in the presence of water, the tailings 309 (and/or mine waste) possess hydraulic cementitious properties. As such, the calcined tailings 309 (and/or calcined mine waste) can be particularly suited for use within the concrete industry. The strength of the calcined tailings 309 (and/or calcined mine waste) and/or the calcined tailings 309 (and/or calcined mine waste) blended with one or more additives (e.g., lime, LKD, or other additives disclosed herein) to provide a cementitious binder having a uniaxial compressive strength (UCS) that increases over time (e.g., approximately 30 days) and/or is at least 7 Megapascals (MPa), 8 MPa, 9 MPa, 10 MPa, 11 MPa, 12 MPa, or 13 MPa, or within a range of 7-13 MPa.

As shown in FIG. 3, the calcined tailings 307 (and/or calcined mine waste) can be directed to the cooler 312, which can be configured to cool the calcined tailings 309 (and/or calcined mine waste) to produce cooled calcined tailings 311 (and/or cooled mine waste), e.g., that is no more than 100° C., 75° C., 50° C., or within a range of 100-50° C. In some embodiments, the cooler 312 may be part of the calciner 308, or be omitted all together. In some embodiments, the cooler 312 can utilize an ambient air stream 332 to cool the calcined tailings 309 (and/or calcined mine waste), and the heated air stream 334 may be combined with the heated air stream 324 used to calcine the tailings 307. Additionally or alternatively, in some embodiments the air stream 334 is combined with the combustion air 320, which advantageously can decrease the amount of fuel 322 needed.

The grinder 314 is positioned downstream of the cooler 312 and/or calciner 308 and is configured to further grind the tailings 311 (and/or mine waste) to have one or more particle characteristics. The grinder 314 can be identical or generally similar to the crusher 302 previously described and thus can be a mill (e.g., a grinding mill, an impact mill, attritor cell mill, etc.) or other device(s) configured to break particles of the tailings 311 (and/or mine waste) into smaller particles via grinding or crushing, e.g., to produce a more uniform particle size distribution. The grinder 314 can be configured such that the produced ground calcined tailings 313 (and/or ground calcined mine waste) have one or more desired characteristics (e.g., a D10, D90, ratio of D90:D10 (i.e., steepness), particle size distribution, maximum particle size, etc.) depending on the particular end application. Such characteristics may directly correlate to time spent in the grinder 314. In some embodiments, the grinder 314 can include one or more air classification units, e.g., to expose a drying fluid (e.g., waste heat air) to the tailings (and/or mine waste) in the grinder 314. In some embodiments, the grinder 314 is omitted from the system 300.

As shown in FIG. 3, the ground calcined tailings 313 (and/or ground calcined mine waste) may be combined with one or more additives 315 ("additives 315"), e.g., in a blender (e.g., a mixer or blending unit) 316 to form a blended end product 317 (e.g., a cementitious blend). The blender 316 may be at a physical location different than the calciner 308, e.g., to avoid transporting the additives 315 to the source of the tailings (and/or mine waste) where the calciner 308 may be located. The additives 315 can include lime (e.g., calcium hydroxide), dolomitic lime, LKD, co-calcined limestone and clay (e.g., argillaceous limestone), quicklime (calcium oxide), gypsum, limetone, pulverized limestone, ground calcium carbonate, natural pozzolans (e.g., volcanic ash), artificial pozzolans (e.g., silica flume), water, flow aids, and/or other fluid or solid sources. The blended end product 317 can serve as (i) a cement blend and/or a supplementary cementitious material that acts as a direct replacement for Portland cement in ready-mix concrete applications, (ii) a pozzolan or direct replacement for coal fly ash, (iii) a chemical soil stabilizer, e.g., for modifying the properties of roadway sublayers and/or (iv) a cement binder, e.g., for use in mine backfill applications.

The desired end application of the blended product 317 may determine which of the additives 315 and amounts thereof are combined with the ground calcined tailings 313 (and/or ground calcined mine waste). Stated differently, combining the additives 315 with the ground calcined tailings 313 (and/or ground calcined mine waste) may be performed such that the blended product 317 has one or more characteristics (e.g., particle size, particle size distribution, composition, % silica, Si:Al ratio, etc.) that are similar to (e.g., within 20%, 10%, or 5% of) corresponding characteristics of the product that the blended product 317 could be used in place of. For example, in such embodiments where the blended product 317 is to be used in the concrete industry (e.g., as a cementitious blend, cement binder, or ready-mix cement or concrete application), it may be desired for the blended product 317 to have a percent composition of silica ($SiO_2$) between 17-25% by weight. As such, if the ground calcined tailings 313 (and/or ground calcined mine waste) have a percent silica composition of 55-70% by weight and a high calcium lime additive has a percent silica composition of 2-5% by weight, then a 30:70 blend of calcined tailings (and/or calcined mine waste):high calcium lime, a 20:80 blend of calcined tailings (and/or calcined mine waste):co-calcined limestone and clay, or a 10:40:50 blend of calcined tailings (and/or calcined mine waste):LKD:co-calcined limestone and clay may achieve the desired amount of silica content for the blended product 317. The amount and type of the additives 315 combined with the blended product 317 may similarly be based on other compositions, such as percent calcium (e.g., via calcium oxide (CaO) or calcium carbonate ($CaCO_3$)), percent magnesium (e.g., via magnesium oxide (MgO) or magnesium carbonate ($MgCO_3$)), percent iron (e.g., via iron (III) oxide ($Fe_2O_3$), percent alumina (e.g., via aluminum oxide ($Al_2O_3$)), and/or percent sulfur. In some embodiments, the blended product may have (i) a percent calcium oxide within a range of 50-70%, 60-70%, or 60-65%, (ii) a percent magnesium oxide within a range of 0.1-10%, 0.1-5%, or 1-4%, (iii) a percent iron oxide with a range of 0.1-12%, 0.1-8%, or 1-6%, (iv) a percent alumina within a range of 1-15%, 3-10%, or 3-8%, (v) a percent silica within a range of 10-30%, 15-30%, or 17-25%, and/or (vi) a percent sulfur trioxide within a range of 0.1-5%, 1-5%, or 1-3%. Such percentages can be determined based on an elemental analysis, e.g., in which an element of this composition is vaporized (e.g., via inductively coupled plasma (ICP)) and then analyzed by spectroscopy or spectrometry (e.g., atomic emission spectroscopy (AES) or mass spectrometry). For example, the percent calcium oxide may be determined based on the elemental amount of calcium, the percent magnesium oxide may be determined based on the elemental amount of magnesium, and the percent iron oxide may be determined based on the elemental amount of iron.

One advantage of embodiments of the present technology is the ability to convert what is currently considered a troublesome waste that is difficult to dispose of, into a material with economic value that can reduce reclamation cost or be sold for profit. In doing so, embodiments of the present technology may enable users to generate a revenue stream from existing tailings (and/or mine waste), and provide an additional incentive to hasten the remediation of tailings (and/or mine waste). Relatedly, embodiments of the present technology can also mitigate those costs associated with treating tailings (and/or mine waste) prior to calcination.

Another advantage of embodiments of the present technology is the ability to decrease the overall volume of fluid tailings generated in the first instance. That is, by calcining the dewatered tailings to produce a solid product, the production of fluid tailings that needs to be later reclaimed can be significantly decreased, thereby decreasing costs associated with the handling and/or storage of these fluid tailings. Additionally, the liability arising from the environmental concerns and/or carbon footprint can also be decreased.

Yet another advantage of embodiments of the present technology is that the cementitious binder blend can be created at lower temperatures compared to Portland cement or other related products, thereby resulting in less greenhouse gas emissions from carbon dioxide produced by fossil fuel (e.g., coal, natural gas, petroleum coke, etc.) combustion. Additional greenhouse gas emission benefits can be realized by preparing the calcined tailings (and/or mine waste) at site (e.g., mine where backfill binders are used), which avoids carbon dioxide emissions from fuels burnt during transportation of the tailings (and/or mine waste) to other sites.

Figure 4:
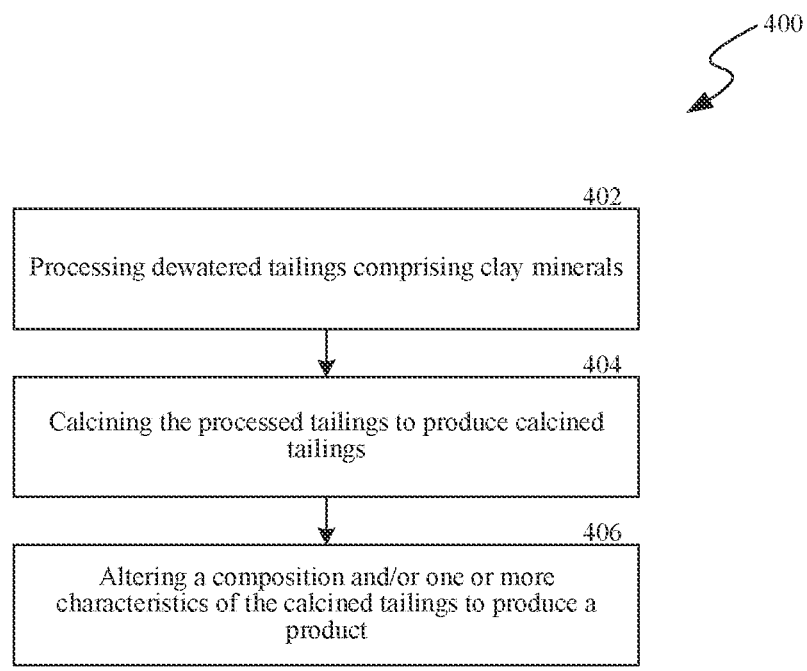
FIG. 4 is a flow diagram of a method for producing a calcined product, in accordance with embodiments of the present technology.

FIG. 4 is a flow diagram of a method 400 for producing a calcined product, in accordance with embodiments of the present technology. The method 400 can include processing dewatered tailings (and/or mine waste) comprising clay minerals (process portion 402). The dewatered tailings can include the dewatered tailings 119 (FIG. 2A) that have been treated with lime at elevated pH levels, and/or the dewatered tailings and/or mine waste 301 (FIG. 3). Processing the dewatered tailings (and/or mine waste) can comprise crushing the dewatered tailings (and/or mine waste) via a crusher (e.g., the crusher 302; FIG. 3) and drying the tailings (and/or mine waste) via a dryer (e.g., the dryer 304; FIG. 3). In some embodiments, crushing the dewatered tailings (and/or mine waste) can form a powder or powder-like particles that may be later calcined in a more energy efficient manner relative to unground dewatered tailings (and/or unground mine waste). Drying the tailings (and/or mine waste) may be performed to drive off moisture, e.g., such that dried tailings (and/or dried mine waste) have a percent moisture content no more than 3%, 2%, 1%, 0.5%, 0.1%, or within a range of 3-0.1% by weight. In some embodiments, drying the tailings (and/or mine waste) can comprise directly heating the tailings (and/or mine waste) with a waste heat stream previously used for calcining purposes. Reducing the moisture content using waste heat can limit the heat needed to later calcine the tailings (and/or mine waste), thereby providing an economic advantage for the overall process.

The method 400 can further include calcining the processed tailings (and/or mine waste) to produce calcined tailings (e.g., the calcined tailings 309) (and/or calcined mine waste) (process portion 404). Calcining the processed tailings (and/or processed mine waste) can be done via a calciner (e.g., the calciner 308; FIG. 3) which may receive the processed tailings (and/or mine waste) from the dryer or a collector (e.g., the collector 306). Calcining the processed tailings (and/or processed mine waste) can comprise heating the processed tailings (and/or processed mine waste), e.g., in the presence of air or oxygen, and/or to a temperature no more than 550° C., 600° C., 650° C., 700° C., 750° C., 800° C., 900° C., 1000° C. or within a range of 550-1000° C. Calcining the processed tailings (and/or processed mine waste) can include decreasing moisture content of the tailings, thermally decomposing the tailings (and/or mine waste) such that at least a portion of the carbon is removed from the tailings (and/or mine waste) (e.g., as carbon dioxide), and/or oxidizing the tailings (and/or mine waste), e.g., to remove organic impurities. In some embodiments, calcining or heating the processed tailings (and/or processed mine waste) can be done directly or indirectly via a heat source comprising heated air (e.g., the heated air stream 324).

Without being bound by theory, limiting the temperature at which the processed tailings (and/or processed mine waste) are heated or calcined can inhibit or prevent damage to the crystal structure of the tailings (and/or mine waste) while also promoting disorganization of silica and alumina of the clay. In doing so, the heating or calcining can ensure pozzolanic activity and/or strength development of the resulting calcined tailings (and/or calcined mine waste) is maintained and/or not unnecessarily decreased. The upper temperature limit at which the processed tailings (and/or processed mine waste) are heated or calcined may be based on the composition of the clay of the tailings (and/or mine waste). For example, when the clay comprises a kaolin group mineral (e.g., greater than 50% by weight, 75% by weight, 90% by weight, 95% by weight, or within a range of 50-95% by weight), the temperature at which the tailings (and/or mine waste) are heated or calcined can be approximately 650° C., 700° C., 750° C., or 800° C., as these temperatures have been shown to sufficiently dehydroxylate the kaolin group mineral while also not causing undesirable changes to the crystal structure that affect the value of the calcined product. As another example, when the clay comprises substantially an illite, smectite, and/or chlorite group mineral, a higher temperature relative to that used to heat or calcine the kaolin group mineral-dominated tailings (and/or mine waste) may be needed to cause sufficient dehydroxylation. For example, when the clay comprises substantially the illite, smectite, and/or chlorite group mineral (e.g., greater than 50% by weight, 75% by weight, 90% by weight, 95% by weight, or within a range of 50-95% by weight), the necessary temperature at which the tailings (and/or mine waste) are heated or calcined to cause sufficient dehydroxylation can be approximately 750° C., 800° C., 900° C., or 1000° C. For the clay compositions comprising substantially the illite, smectite, and/or chlorite group mineral, these temperatures have been shown to not cause undesirable changes to the crystal structure that affect the value of the calcined product.

The method 400 can further include altering a composition and/or one or more characteristics of the calcined cium carbonate or calcite). Table 1 below includes various compositions including these components, and corresponding 7-day and 28-day unconfined compressive strength (UCS) values for each. The UCS measurements were determined based in part on ASTM C109 "Standard Test Method for Compressive Strength of Hydraulic Cement Mortars" using 2 inch (or 50 mm) cube specimens.

TABLE 1

| Composition | | | | 7 Day UCS | 28 Day UCS | Relative performance to Portland Cement | |
|---|---|---|---|---|---|---|---|
| Portland Cement | Quicklime | Limestone | Calcined Clay Tailings | MPa | MPa | Day 7 | Day 28 |
| 50.00% | 10.00% | 20.00% | 20.00% | 7.1 | 8.3 | 53% | 65% |
| 50.00% | 7.50% | 21.25% | 21.25% | 7.1 | 8.8 | 53% | 69% |
| 50.00% | 5.00% | 22.50% | 22.50% | 6.2 | 10.6 | 47% | 83% |
| 100% | 0.00% | 0.00% | 0.00% | 13.3 | 12.7 | 100% | 100% | tailings (and/or calcined mine waste) to produce a product (e.g., the ground calcined tailings 313, ground calcined mine waste, or the blended product 317; FIG. 3) (process portion 406). Altering one or more characteristics ("characteristics") of the calcined tailings (and/or calcined mine waste) can include altering a particle size, particle size distribution, D10, D90, D90/D10 ratio, and/or maximum particle size of the calcined tailings (and/or calcined mine waste). In some embodiments, such characteristics may be altered by grinding the calcined tailings (and/or calcined mine waste) via a grinder (e.g., via the grinder 314) to produce ground tailings (e.g., the ground calcined tailings 313; FIG. 3) (and/or ground calcined mine waste).

Altering the composition of the calcined tailings (and/or calcined mine waste) can include combining the calcined tailings (and/or calcined mine waste) with one or more additives ("additives") (e.g., the additives 315; FIG. 3) to form a blended product (e.g., the blended product 317; FIG. 3). Such combining may occur in a physical location different than where the calcining occurs, e.g., to avoid transporting the additives to the source of the tailings ponds where the calciner may be located. As previously described, the additives can include lime (e.g., calcium hydroxide), dolomitic lime, LKD, quicklime, co-calcined limestone and clays (e.g., argillaceous limestone), gypsum, limestone, pulverized limestone, ground calcium carbonate, natural pozzolans (e.g., volcanic ash), artificial pozzolans (e.g., silica flume), water, flow aids, etc. The blended product can serve as (i) a cementitious blend and/or a direct replacement for Portland cement in ready-mix concrete applications, (ii) a pozzolan or direct replacement for coal fly ash, (iii) a chemical soil stabilizer, e.g., for modifying the properties of roadway sublayers and/or (iv) a cement binder, e.g., for use in mine backfill applications. As previously described, the desired end application of the blended product may determine which of the additives and amounts thereof are combined with the calcined tailings.

IV. Experimental Results

The calcined tailings (e.g., the calcined tailings 309; FIG. 3) described herein can be combined with one or more additives to form a blended product. As an example, calcined tailings can be combined with Portland Cement, quicklime (i.e., calcium oxide), and/or limestone (i.e., cal- The first three compositions include 50% by weight Portland Cement and a balance of various concentrations of quicklime, limestone, and calcined tailings, and is compared to the fourth composition which is 100% Portland Cement. For each of the first three compositions, the UCS increases over time (e.g., from the 7-day mark to the 28-day mark), with the largest increase in UCS being from 6.2 MPa at the 7-day mark to 10.6 MPa at the 28-day mark. Advantageously, combining the calcined tailings with Portland Cement creates, in effect, a cement extender that costs less than Portland Cement alone to produce and, relative to Portland Cement alone and/or the combination of Portland Cement and fly ash, has a lower carbon footprint. Additional advantages to using calcined tailings as a cement extender include (i) converting what is currently considered a troublesome waste that is difficult to dispose of into a material with economic value that can reduce reclamation cost or be sold for profit, (ii) decreasing the overall volume of fluid tailings generated in the first instance, and (iii) reducing the reliance on fly ash, for which the supply is decreasing due to the decommissioning of coal facilities.

The first three compositions including the calcined tailings passed the Frattini test, which was conducted to test the pozzolanicity, a generally desirable feature, of the compositions. This test indicates that the first three compositions have pozzolanic properties and are able to consume sufficient amounts of calcium and hydroxide ions. Portland cement by itself fails the Frattini test because Portland cement is unable to consume sufficient amounts of calcium and hydroxide ions. For a specific chemical type of pozzolans (e.g. a specific tailings containing clay minerals), the relative values of calcium and hydroxide consumption may be used comparatively. The results of the testing can be used to understand if a material is pozzolanic and refine process conditions to optimize the pozzolanic properties.

V. Conclusion

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, uniaxial compressive strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A method for treating tailings, comprising:
processing dewatered tailings to produce processed tailings, the dewatered tailings comprising clay minerals and a pH of at least 11.5;
calcining, via a calciner, the processed tailings to produce calcined tailings comprising a pozzolan and a moisture content of no more than 0.1%, by directing to the calciner a heated air stream having a temperature within a range of 600-1100° C., wherein calcining comprises heating the processed tailings to a temperature no more than 1000° C.; and
after calcining, altering a composition of the calcined tailings to produce a product.

2. The method of claim 1, wherein the heated air stream exiting the calciner has a temperature within a range of 350-800° C., and wherein processing the dewatered tailings comprises drying, in a dryer upstream of the calciner, the dewatered tailings via the heated air stream exiting the calciner.

3. The method of claim 1, wherein processing the dewatered tailings comprises:
drying the dewatered tailings via the heated air stream exiting the calciner to produce dried tailings having a moisture content of no more than 3% by weight; and
cooling, in a cooler downstream of the calciner, the calcined tailings via an ambient air stream.

4. The method of claim 3, wherein the ambient air stream exiting the cooler is combined with the heated air stream prior to directing the heated air stream to the calciner.

5. The method of claim 1, wherein processing the dewatered tailings comprises (i) crushing the dewatered tailings to produce crushed tailings, and (ii) drying the crushed tailings to produce dried tailings having a moisture content within a range of 1-9% by weight, and wherein calcining the processed tailings comprises calcining the dried tailings.

6. The method of claim 1, wherein the clay minerals comprise a kaolin group mineral, and wherein calcining the processed tailings comprises heating the processed tailings to a temperature no more than 800° C.

7. The method of claim 1, wherein the clay minerals comprise at least one of an illite group mineral, a chlorite group mineral, or a smectite group mineral.

8. The method of claim 1, wherein the product has a composition comprising—
a percent calcium oxide within a range of 30-70%
a percent magnesium oxide within a range of 0.1-10%,
a percent iron oxide with a range of 0.1-12%,
a percent alumina within a range of 1-15%,
a percent sulfur trioxide within a range of 0.1-5%, and
a percent silica within a range of 10-30%.

9. The method of claim 1, wherein altering the composition comprises blending or combining one or more additives with the calcined tailings, the additives including at least one of lime, dolomitic lime, lime kiln dust, quicklime, hydrated lime, cement kiln dust, argillaceous limestone, limestone, pulverized limestone, ground calcium carbonate, natural pozzolans, artificial pozzolans, or gypsum.

10. A system for calcining tailings, comprising:
a dewatering device configured to produce dewatered tailings having a pH of at least 11.5;

a calciner configured to receive and heat the dewatered tailings to a temperature no more than a predetermined threshold temperature of no more than 1000° C. and produce calcined tailings;

a burner configured to produce heated air having a temperature within a range of 600-1100° C., wherein the dewatered tailings are heated in the calciner via the heated air; and a milling device configured to receive the calcined tailings and produce a milled product comprising— a percent alumina within a range of 1-15%, and a percent silica within a range of 10-30%.

11. The system of claim 10, further comprising a dryer positioned between the dewatering device and the calciner, the dryer being configured to receive and remove moisture via drying from the dewatered tailings to produce dried tailings, the dried tailings having a moisture content of no more than 6% by weight, wherein the dryer is configured to receive a waste heat stream for the drying.

12. The system of claim 10, further comprising a dryer upstream of the calciner, wherein the dryer is configured to receive the heated air from the calciner and remove moisture from the dewatered tailings via the heated air.

13. The system of claim 10, further comprising a cooler downstream of the calciner and configured to receive the calcined tailings and ambient air, the cooler being configured to cool the calcined tailings via the ambient air.

14. The system of claim 10, further comprising a blender downstream of the milling device and positioned to receive the milled product and one or more additives comprising at least one of lime, dolomitic lime, lime kiln dust, quicklime, hydrated lime, cement kiln dust, argillaceous limestone, limestone, pulverized limestone, ground calcium carbonate, natural pozzolans, artificial pozzolans, or gypsum.

15. The system of claim 10, further comprising a blender downstream of the milling device and configured to combine the milled product with one or more additives to produce a cementitious product having a uniaxial compressive strength at least 8 Megapascals (MPa).

16. The system of claim 15, wherein the cementitious product has a composition comprising— a percent calcium oxide within a range of 50-70% a percent magnesium oxide within a range of 0.1-10%, a percent iron oxide with a range of 0.1-12%, and a percent sulfur trioxide within a range of 0.1-5.

17. The system of claim 10, wherein:

the predetermined temperature is 1000° C., in operation, by heating the dewatered tailings, the calciner removes one or more organic impurities from the dewatered tailings, the organic impurities comprising at least one of bitumen, polymers, or napthenic acids, and the calciner is a rotary calciner or a flash calciner.

18. A system for calcining tailings, comprising:

a precalcining subsystem configured to process dewatered tailings and produce processed tailings, wherein the dewatered tailings comprise clay minerals and a pH of at least 11.5;

a burner configured to produce a heated air stream having a temperature within a range of 600-100° C.; and a calciner downstream of the precalcining subsystem and configured to heat the processed tailings via the heated air stream to produce calcined tailings, wherein the calcined tailings comprise a temperature no more than 1000° C., a pozzolan, and a moisture content of no more than 0.1%.

19. The system of claim 18, wherein the precalcining subsystem comprises a dryer positioned upstream of the calciner and configured to dry the dewatered tailings via the heated air stream exiting the calciner.

20. The system of claim 18, wherein the precalcining subsystem includes:

a dryer configured to dry the dewatered tailings via the heated air stream exiting the calciner to produce dried tailings having a moisture content of no more than 3% by weight; and a cooler positioned downstream of the calciner and configured to cool the calcined tailings via an ambient air stream.

* * * * *

UNITED STATES PATENT AND TRADEMARK OFFICE
CERTIFICATE OF CORRECTION

PATENT NO. : 11,725,148 B2
APPLICATION NO. : 17/560884
DATED : August 15, 2023
INVENTOR(S) : Nikolas Andrei Romaniuk et al.

It is certified that error appears in the above-identified patent and that said Letters Patent is hereby corrected as shown below:

In the Claims

In Column 32, Line 19, Claim 18, delete "100" and insert -- 1100 --, therefor.

Signed and Sealed this
Nineteenth Day of September, 2023

Katherine Kelly Vidal
*Director of the United States Patent and Trademark Office*